(12) United States Patent
Yoshiaki

(10) Patent No.: US 7,151,618 B2
(45) Date of Patent: Dec. 19, 2006

(54) HALFTONE DOT PRODUCING APPARATUS AND HALFTONE DOT PRODUCING PROGRAM STORAGE MEDIUM

(75) Inventor: Inoue Yoshiaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 900 days.

(21) Appl. No.: 09/727,590

(22) Filed: Dec. 4, 2000

(65) Prior Publication Data
US 2002/0051213 A1  May 2, 2002

(30) Foreign Application Priority Data
Dec. 2, 1999  (JP)  ................................. 11-343223

(51) Int. Cl.
G06K 15/00 (2006.01)
H04N 1/40 (2006.01)
H04N 1/405 (2006.01)

(52) U.S. Cl. .................. 358/3.06; 358/3.11; 358/3.12; 358/3.2; 358/3.26

(58) Field of Classification Search ...... 358/3.11–3.14, 358/3.26, 500, 1.9, 3.06, 3.16, 3.2
See application file for complete search history.

(56) References Cited

U.S. PATENT DOCUMENTS 5,045,931 A * 9/1991 Sakamoto ............... 358/534
5,223,953 A * 6/1993 Williams ................. 358/3.2
5,315,407 A * 5/1994 Sakamoto et al. ........ 358/3.07
5,781,709 A * 7/1998 Usami et al. ............. 358/1.9
5,828,463 A * 10/1998 Delabastita .............. 358/3.17

FOREIGN PATENT DOCUMENTS

JP    2-134635    5/1990

OTHER PUBLICATIONS

Inside ADOBE® Photoshop® 5, by Gary David Bouton, Barbara Mancuso Bouton, and Gary Kubicek, New Riders Publishing, copyright 1998, pp. 46-49.*

* cited by examiner

Primary Examiner—Thomas D. Lee
Assistant Examiner—James A. Thompson
(74) Attorney, Agent, or Firm—Sughrue Mion, PLLC

(57) ABSTRACT

There are disclosed a halftone dot producing apparatus in which a phase of halftone dots is freely set up in at least one color plate of the color plates. The halftone dot producing apparatus has an image pixel position deriving section for deriving pixel positions (i, j) associated with values G (i, j) of multi-tone level image data, a threshold pixel position set up section for setting up the pixel position of the associated threshold table to a position in which the pixel position is shifted by the phase ($\Delta i$, $\Delta j$), a threshold table selection section for selecting the threshold table, a threshold set up section for setting up a threshold associated with the pixel position of the threshold table in accordance with the selected threshold table, and a comparison section for comparing the threshold set up by the threshold set up section with the value G (i, j) to produce value D (i, j) of halftone dot image data.

15 Claims, 21 Drawing Sheets

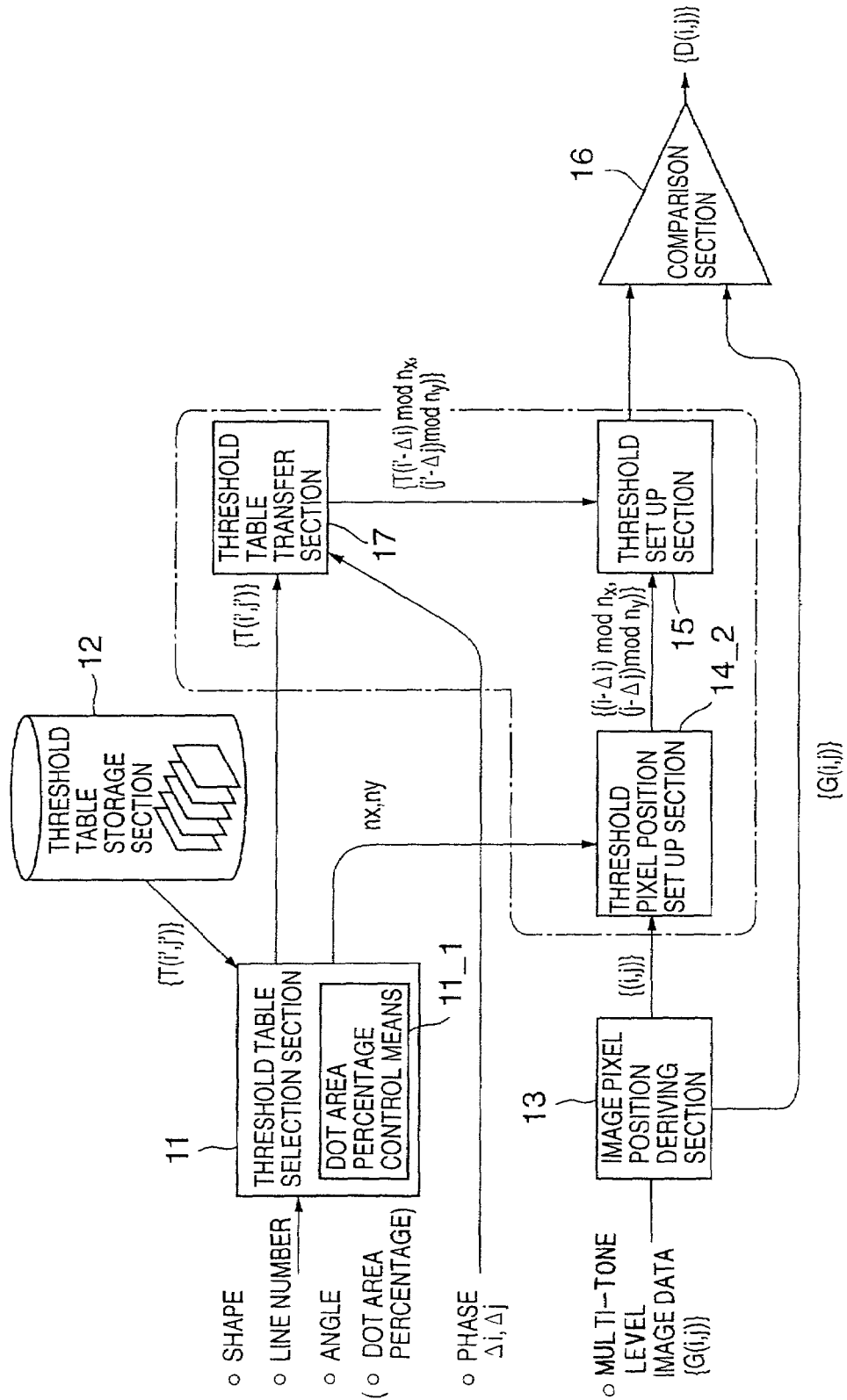

HALFTONE DOT PRODUCING APPARATUS AND HALFTONE DOT PRODUCING PROGRAM STORAGE MEDIUM

BACKGROUND OF THE INVENTION

1. Field of the Invention

The present invention relates to a halftone dot producing apparatus for producing a plurality of halftone dot image data representative of a plurality of monochromatic images in which a color image is separated, and a halftone dot producing program storage medium storing a program which causes a computer system to operate as the halftone dot producing apparatus.

2. Description of the Related Art

Conventionally, a color image print is produced by reading in a color image by a color scanner and editing the color image thus read (page make-up); reading in multi-tone level image data of color plates (e.g., yellow (Y), magenta (M), cyan (C) and black (K)) that are representative of the image completed by the page make-up; producing halftone dot image data of YMCK color plates according to the multi-tone level image data of those color plates by using a halftone dot producing apparatus; producing plate making films for the color plates carrying the halftone dot images of YMCK color plates according to the halftone dot image data of the color plates; printing of printing plates for the color plates by using the plate making films; and printing, on a predetermined medium, a color image in which the halftone dot images of the YMCK color plates are superposed on one another, using those printing plates with a predetermined printing machine.

Generally, as described above, the printing of the color image is on a large scale. Thus, an operator, who takes part in producing the color image print, uses a proofer to produce a simple image (proof) of the color image before the final printing, and verifies the quality of the final printed color image by referring to the proof image outputted from a printer in accordance with the proofer.

The halftone dot images of the YMCK color plates, which constitute the color images, are composed of screens of halftone dots arranged with slopes of angles 0°, 15°, 45° and 75°, for example, respectively. In those halftone dot images, a gradation of the image is represented by an area modulation for the individual halftone dot. An arrangement of the halftone dots in the halftone dot images is defined by the number of lines representative of the density of the lines consisting of columns of halftone dots other than the above-mentioned angles. The color image, in which the halftone dot images are superposed on one another, is associated with a Rosette pattern that is peculiar to the printed image because of the superimposition of the MCK plates (the Y plate is excluded because of its light color).

The conditions that produce a Rosette pattern have previously been analyzed. For example, as explained in Japanese Patent Application Laid Open Gazette Hei. 2-58176, a Rosette pattern is formed by setting up the number of lines of the halftone and the angles in such a manner that a row of the halftone dots of the screen is grasped as a wave and a secondary moiré is prevented from occurring because of the overlapping of a primary moiré, produced by the overlapping of a screen of an angle 15° and a screen of an angle 75°, and a screen of an angle 45°. That is, the primary moiré and a wave number component of the screen of the angle 45° are coincident with one another.

A combination of the angles of the halftone dots used in a print, is generally 15°, 45° and 75°. It is important that a relative angle between those angles is at intervals of 30 degrees, and it is noted that the combination is not restricted to the angles as mentioned above. For example, it is known that a Rosette pattern also occurs in a combination of 22.5°, 52.5° and 82.5°. Generally, the halftone dots are arranged as a tetragonal lattice, and thus it is arranged in angles added with ±90° or 180°. Accordingly, it happens that the angles of the halftone dots are referred to in angles added with ±90° or 180°.

It is well known, as shown at pages 56 to 57, "Post Script Screening" (Inter Press) written by Peter Fink, that there are two sorts of Rosette patterns of "clear center" and "dot center".

FIG. 25 is an illustration showing Rosette pattern of the clear center. FIG. 26 is an illustration showing Rosette pattern of the dot center.

As shown in FIG. 25, Rosette pattern of the clear center has a center portion a1 which is cleared, and has a pattern of halftone dots expanding as a circle in the vicinity of the center portion a1. And as shown in FIG. 26, Rosette pattern of the dot center has a center portion a2 which is dotted, and has a pattern of halftone dots expanding as a circle in the vicinity of the center portion a2.

A clear-centered Rosette pattern and dot-centered Rosette pattern may be changed therebetween by shifting, of three screens constituting those patterns, a superimposing position of one screen with respect to other screens, for example. In accordance with an image, a selection between a clear-centered Rosette pattern and a dot-centered Rosette pattern can be made with respect to a set of halftone dot image data of YMCK color plates on RIP (Raster Image Processor) for developing information of characters and images into a bit map, which is connected to a film setter that outputs the plate making film. The difference between the Rosette patterns is caused by a difference in the superpositioning of halftone dots of the screens by the deviation of a superimposing position of the above-mentioned three screens. Hereinafter, positions of the above-mentioned three screens constituting a clear-centered Rosette pattern, for example, are defined as reference positions, and the positions of the three screens with respect to the reference positions are referred to as phases of the halftone dots on the screens, respectively.

However, in various steps of the conventional color image printing method, as described above, a register discrepancy can occur in which positions of the color plates are deviated. For example, even if halftone dot image data is related to a Rosette pattern representative of the clear-center or the dot-center, the expected clear-centered Rosette pattern or the expected dot-centered Rosette pattern does not appear.

A Rosette pattern is preferable in the sense that the occurrence of the secondary moiré is suppressed. However, if the Rosette pattern is clearly generated as shown in FIGS. 25 and 26, the Rosette pattern is visible to the naked eye and thus, the Rosette pattern is not preferable on the basis of image quality. Hereinafter, a Rosette pattern, which is not preferable on the basis of image quality, such as the clear-centered Rosette pattern or dot-centered Rosette pattern described above, is referred to as a Rosette moiré. In various steps of the conventional color image printing, as described above, a register discrepancy is generated. Thus, in the actual print, a Rosette moiré will occur if a phase between the color plates due to the register discrepancy is near a phase implementing a clear-centered Rosette pattern and a dot-centered Rosette pattern described above.

As a method of suppressing the Rosette moiré, Japanese Patent Application Laid Open Gazette Hei. 2-134635 proposes a method in which a phase of halftone dot of one color plate is shifted to an intermediate phase between a phase implementing the clear-centered Rosette pattern and a phase implementing the dot-centered Rosette pattern. This intermediate phase is far from the phases implementing the clear-centered Rosette pattern and the dot-centered Rosette pattern. Thus, this method makes it possible to suppress the occurrence of Rosette moiré in cases where the register discrepancy of the color plate in the various steps of conventional color image printing is small.

Recently, advances in the digitalization of the printing process, and digitization of the page make-up of page data has improved register accuracy so that the registration of the color plates at the time of the page make-up has improved. Further, in CTP (Computer To Plate) printing, where digital data is directly written onto a printing plate and in CTC (Computer To Cylinder) printing, where digital data is directly written onto a printing plate on a cylinder of a printing machine, the registering of the position of the color plates at the time of the page make-up is implemented with greater accuracy. For this reason, if no phase control of halftone dots of the color plates is performed, there is a tendency that a Rosette moiré, which was not obvious until now because of register discrepancy, appears on the printed image and is visible to the naked eye. The occurrence of the Rosette moiré can be suppressed in accordance with the above described method in which a phase of halftone dot of one color plate is shifted to be an intermediate phase between a phase implementing the clear-centered Rosette pattern and a phase implementing the dot-centered Rosette pattern, and the intermediate phase is far from any of the phases implementing the clear-centered Rosette pattern and the dot-centered Rosette pattern. However, in a situation where great accuracy in registering has been implemented, as described above, it is desirable that the phase is freely changed so that the Rosette pattern is altered in accordance with the user's request, without the need to fix the phase onto the above-mentioned intermediate phase in order to avoid the Rosette moiré.

In the processes of printing using a film setter according to the prior art, it often happens that a register discrepancy occurs when producing the plate making film and the printing of the printing plate, and thus, in some cases, the Rosette moiré is not generated on the final print. However, a proofer generally plots position with great accuracy, and particularly, if a phase control for halftone dots of the color plates is not performed, a Rosette moiré appears on the outputted proof image. Although the proof image is produced in approximation of the final image print, generation of such a Rosette moiré will bring about the possibility that the proof image is different in impression from the final image print. For this reason, it is desirable to enhance a reproducibility of the proof image with respect to an image print by means of controlling a phase of halftone dots in at least one color plate of the color plates constituting a proof image in accordance with a degree of a register discrepancy of the image print.

SUMMARY OF THE INVENTION

In view of the foregoing, it is an object of the present invention to provide a halftone dot producing apparatus in which a phase of halftone dots is freely set up in at least one color plate of the color plates, and a halftone dot producing program storage medium storing a program which causes a computer system to operate as the halftone dot producing apparatus.

To achieve the above-mentioned object, the present invention provides a halftone dot producing apparatus for producing a plurality of halftone dot data representative of a plurality of monochromatic images in which a color image is separated, by applying threshold matrixes associated with colors to a plurality of multi-tone level image data representative of a plurality of monochromatic images in which a color image is separated, said halftone dot producing apparatus comprising:

a phase selection section for selecting a phase between at least a first threshold matrix of said threshold matrixes and a first monochromatic image represented by a multi-tone level image data to which said first threshold matrix is applied;

a phase control section for controlling a relative phase between said first threshold matrix and said first monochromatic image to implement the phase selected by said phase selection section; and a data producing section for producing a plurality of halftone dot data representative of a plurality of monochromatic images in which a color image is separated, by applying threshold matrixes associated with multi-tone level image data representative of monochromatic images excepting said first monochromatic image, of said plurality of multi-tone level image data, to the multi-tone level image data representative of said monochromatic images excepting said first monochromatic image, of said plurality of multi-tone level image data, with a phase determined on a fixing basis, and applying said first threshold matrix to multi-tone level image data representative of said first monochromatic image, of said plurality of multi-tone level image data, with the phase controlled by said phase control section.

In the event that two or more first threshold matrixes exist, the phase selection section can select mutually different phases for the respective first monochromatic images to which the respective first threshold matrixes are applied.

According to the halftone dot producing apparatus of the present invention as mentioned above, the phase selection section selects a phase between the first threshold matrix and the first threshold matrix in accordance with an operation of a user for example, so that a phase of halftone dots of a plurality of monochromatic images wherein a color image is separated is arbitrarily altered. On the color image wherein a plurality of monochromatic images, which are controlled in phase of halftone dots, are superimposed on one another, there appear various Rosette patterns according to phases of halftone dots of the monochromatic images.

In the event that such a halftone dot producing apparatus is used as an apparatus for producing halftone dot image data for color plates to be entered to a predetermined color printing apparatus, an image, which is printed by the color printing apparatus in accordance with the halftone dot image data for color plates controlled in phase of halftone dot, is not conspicuous in Rosette moiré.

Further, in the event that the halftone dot producing apparatus of the present invention as mentioned above, is used in a proofer, and the halftone dot producing apparatus controls the phase of halftone represented by halftone dot image data for color plates in accordance with a degree of register discrepancy of an image of a printed matter to be simulated by the proofer, a proof image outputted from the proofer makes it possible to at least approximately reproduce a Rosette pattern of halftone dots as to the image of the printed matter.

In the halftone dot producing apparatus according to the present invention as mentioned above, it is preferable that said phase selection section selects any one of a plurality of phases between a phase in which a Rosette pattern of a clear center appears on a color image represented by said plurality of halftone dot image data, and a phase in which a Rosette pattern of a dot center appears on the color image represented by said plurality of halftone dot image data.

According to the halftone dot producing apparatus of the present invention as mentioned above, it is possible to implement various Rosette patterns from a Rosette pattern of the clear center to a Rosette pattern of the dot center, in accordance with an operation of a user for example, on halftone dots of a color image represented by the plurality of halftone dot image data.

In the halftone dot producing apparatus according to the present invention as mentioned above, it is acceptable that said phase control section controls a phase of said first threshold matrix for said first monochromatic image.

In the halftone dot producing apparatus according to the present invention as mentioned above, it is acceptable that said phase control section controls a phase of said first monochromatic image to said first threshold matrix.

In the halftone dot producing apparatus according to the present invention as mentioned above, it is preferable that said halftone dot producing apparatus further comprises:

an image producing section for producing multi-tone level image data for evaluating a Rosette pattern; and a display section for displaying a Rosette pattern on an image represented by an assembly of halftone dot image data obtained by applying the threshold matrixes to the multi-tone level image data produced by said image producing section.

Here, it is acceptable that the image producing section produces multi-tone level image data or reads out stored multi-tone level image data whenever necessary.

According to the halftone dot producing apparatus as mentioned above, a Rosette pattern is displayed on the display section. Thus, a user is able to easily check the Rosette pattern implemented at various phases.

In this case, it is preferable that the image producing section as mentioned above produces multi-tone level image data representative of uniform images having uniform values throughout whole image areas.

When uniform images are used for evaluating a Rosette pattern, the Rosette pattern which is particularly easy to be observed and evaluated is displayed.

Here, in the halftone dot producing apparatus according to the present invention as mentioned above, it is preferable that said halftone dot producing apparatus further comprises:

a dot area percentage selection section for selecting a dot area percentage, and dot area percentage control means for controlling a relative value between thresholds constituting the threshold matrixes and a density level of the uniform image in such a manner that monochromatic images of the dot area percentage selected by said dot area percentage selection section can be obtained.

According to the halftone dot producing apparatus as mentioned above, a user is able to easily check the Rosette pattern at various dot area percentage, implemented at various phases.

In the halftone dot producing apparatus according to the present invention as mentioned above, it is preferable that said halftone dot producing apparatus further comprises an handler for selecting a phase between said first threshold matrix for said first monochromatic image, and said phase selection section selects the phase in accordance with an operation of said handler.

In the halftone dot producing apparatus according to the present invention as mentioned above, it is preferable that said halftone dot producing apparatus further comprises a handler for controlling a dot area percentage, and said dot area percentage selection section selects the dot area percentage in accordance with an operation of said handler.

The adoption of those handlers makes it possible for a user to easily select the phase and the dot area percentage.

To achieve the above-mentioned object, the present invention provides a halftone dot producing program storage medium for storing a halftone dot producing program which causes a computer system to operate, when the halftone dot producing program is executed in said computer system, as a halftone dot producing apparatus for producing a plurality of halftone dot data representative of a plurality of monochromatic images in which a color image is separated, by applying threshold matrixes associated with colors to a plurality of multi-tone level image data representative of a plurality of monochromatic images in which a color image is separated, wherein said halftone dot producing program storage medium stores a halftone dot producing program comprising:

a phase selection means for selecting a phase between at least a first threshold matrix of said threshold matrixes and a first monochromatic image represented by a multi-tone level image data to which said first threshold matrix is applied;

a phase control means for controlling a relative phase between said first threshold matrix and said first monochromatic image to implement the phase selected by said phase selection means; and a data producing means for producing a plurality of halftone dot data representative of a plurality of monochromatic images in which a color image is separated, by applying threshold matrixes associated with multi-tone level image data representative of monochromatic images excepting said first monochromatic image, of said plurality of multi-tone level image data, to the multi-tone level image data representative of said monochromatic images excepting said first monochromatic image, of said plurality of multi-tone level image data, with a phase determined on a fixing basis, and applying said first threshold matrix to multi-tone level image data representative of said first monochromatic image, of said plurality of multi-tone level image data, with the phase controlled by said phase control means.

The computer system, which operates, when the halftone dot producing program is executed in the computer system, as a halftone dot producing apparatus, has the same effect as the halftone dot producing apparatus of the present invention as mentioned above.

While the similar names are applied to the structural elements in the halftone dot producing apparatus and the halftone dot producing program storage medium, those structural elements mean the hardware and the software in the halftone dot producing apparatus, and mean only the software in the halftone dot producing program storage medium.

BRIEF DESCRIPTION OF THE DRAWINGS

FIG. 14 is a schematic construction view of a second C data conversion section which is an one embodiment of a C data conversion section in the halftone dot producing apparatus according to an embodiment of the present invention shown in FIG. 7.

DETAILED DESCRIPTION OF PREFERRED EMBODIMENTS

Embodiments of the present invention will be described with reference to the accompanying drawings.

Figure 1:
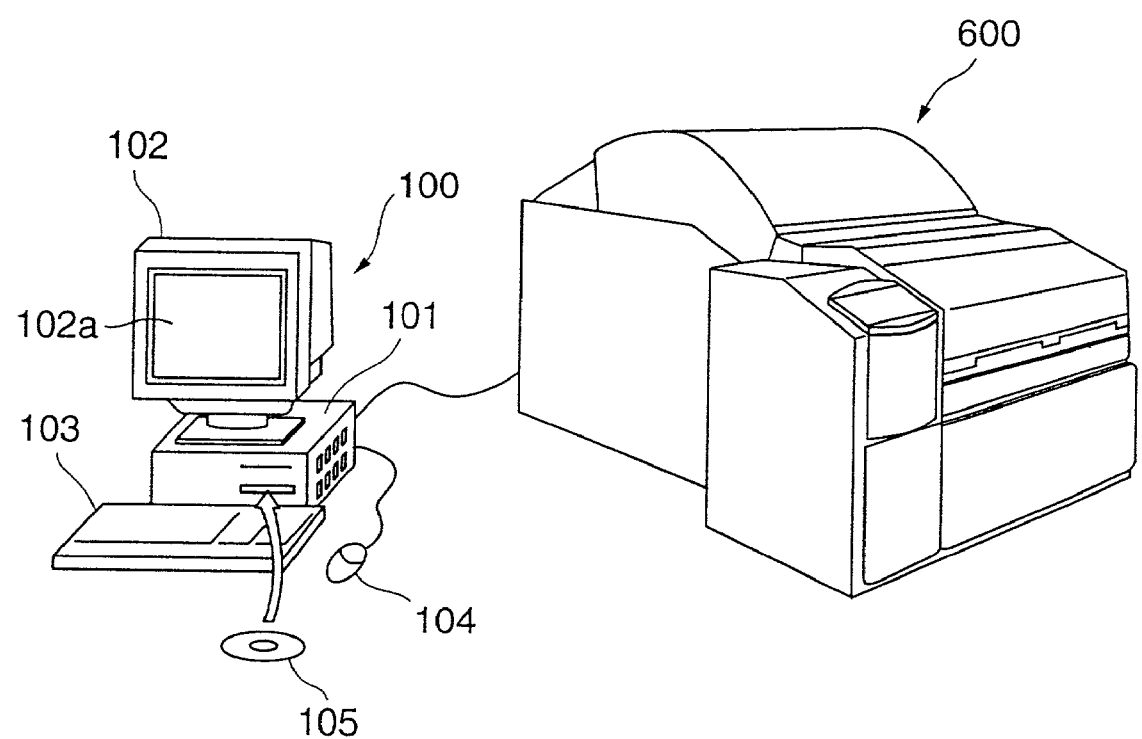
FIG. 1 is a view showing a state that a halftone dot producing apparatus according to an embodiment of the present invention and a CTO.

FIG. 1 is a view showing a state that a halftone dot producing apparatus according to an embodiment of the present invention and a CTO.

FIG. 1 shows a halftone dot producing apparatus 100 implemented on a computer system and a CTP 600. A printing system for printing a color image comprises the halftone dot producing apparatus 100 and the CTP 600, and a printing machine (not illustrated). Hereinafter, in the event that the halftone dot producing apparatus 100 is dealt with as the computer system, the halftone dot producing apparatus 100 is referred to as the computer system 100.

The halftone dot producing apparatus 100, or the computer system 100 comprises: a main frame 101 including a CPU, a hard disk, a communication board, and so forth; a CRT display 102 for performing a display of pictures and characters on a display screen 102a in accordance with an instruction from the main frame 101; a keyboard 103 for entering a user's instruction and character information to the computer system; and a mouse 104 for entering an instruction according to an icon or the like displayed at a designated position on the display screen 102a.

A CD-ROM 105 is detachably loaded on the main frame 101 which incorporates therein a CD-ROM drive for reproducing information stored in the CD-ROM 105. Further, an MO 106 (not illustrated in FIG. 1) is detachably loaded on the main frame 101 which incorporates therein an MO drive for performing recording and reproducing of information to the loaded MO 106.

The halftone dot producing apparatus 100 receives multi-tone level image data for CMYK color plates for example from an external computer (not illustrated) through a communication network, or receives data through a storage medium such as a CD-R (Compact Disc Recordable) and an MO (Magneto-Optical disk). The halftone dot producing apparatus 100 converts the received multi-tone level image data for CMYK color plates into halftone dot image data for CMYK colors. The halftone dot image data thus produced are transmitted to the CTP 600. The CTP 600 is an apparatus for directly printing a printing plate without passing through a film setter. Thus, the CTP 600 is used to generate a difference between two states of the lipophilic nature and the hydrophilic nature through an exposure on the printing plates for CMYK colors in accordance with the halftone dot image data thus transmitted, so that images on the color plates are printed on the associated printing plates, respectively. The printing plates for the color plates, on which images on the color plates are printed, are winded around a drum, when the printing machine has the drum, and an ink of a color represented by the image of the printing plate is applied to the printing plate on the drum. Thus, the printing machine transfers in turn inks of the respective colors to a printing paper, so that a printed matter of a color image according to the halftone dot images of color plates printed on the printing plates for the color plates on the drum is completed.

Figure 2:
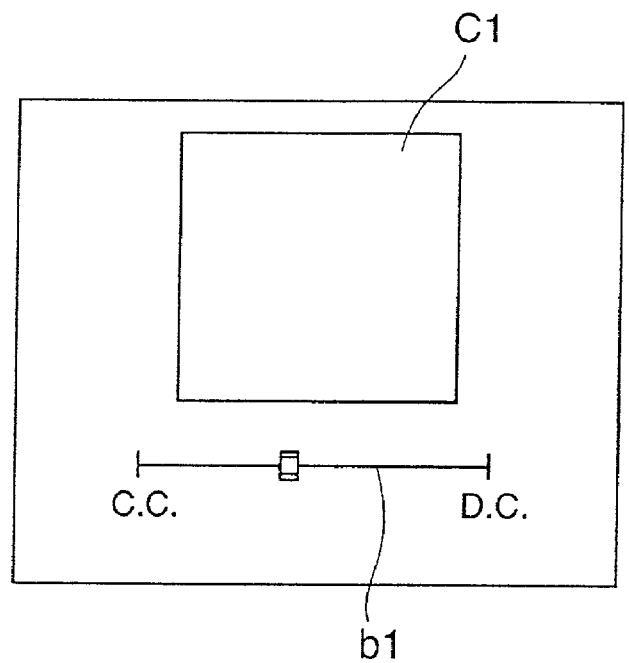
FIG. 2 is a view showing a phase control screen of a halftone dot producing apparatus according to an embodiment of the present invention.
Figure 3:
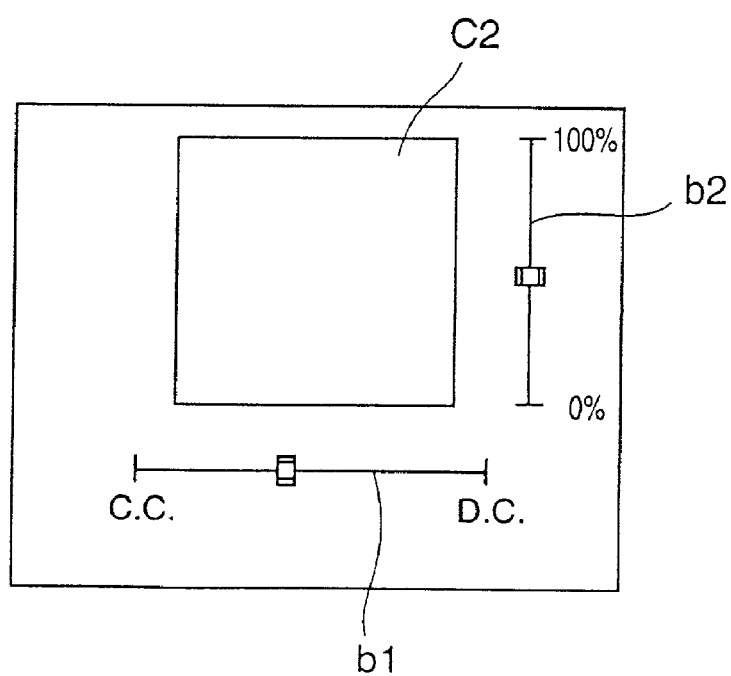
FIG. 3 is a view showing a first phase control screen displaying a Rosette pattern of a halftone dot producing apparatus according to an embodiment of the present invention.

A phase control screen, which is shown in FIGS. 2 and 3, is selectively displayed on the display screen 102a.

FIG. 2 is a view showing a phase control screen of a halftone dot producing apparatus according to an embodiment of the present invention.

FIG. 3 is a view showing a first phase control screen displaying a Rosette pattern of a halftone dot producing apparatus according to an embodiment of the present invention.

On the phase control screen shown in FIG. 2, a halftone dot image c1 of color and a slide bar b1 for a phase control are displayed. The halftone dot image c1 of color is obtained through a simulation of the halftone dot image finally printed by the printing machine, and is a color image in which images of the color plates represented by the halftone image data for the color plates produced by the halftone dot producing apparatus 100 are superimposed on one another.

On the phase control screen shown in FIG. 3, a Rosette pattern c2, the slide bar b1 for a phase control, and a slide bar b2 for an alteration of dot area percentage are displayed. The Rosette pattern c2 is of an image in which images of halftone dots having dot area percentage determined in accordance with the operation of the slide bar b2 for an alteration of dot area percentage are superimposed on one another in a phase determined in accordance with the operation of the slide bar b1 for a phase control. This Rosette pattern c2 is displayed in such a manner that the Rosette pattern is clearly identified. As the phase control screen for displaying Rosette patterns, there are considered various types of ones. There will be described second to seventh phase control screens later.

In the halftone dot producing apparatus 100, halftone dot data for the CMYK color plates produced by the halftone dot producing apparatus 100 controls only a phase of halftone dots of a C-plate image in accordance with the operation of the slide bar b1. However, it is acceptable that a phase of halftone dots of an M-plate image or a phase of halftone dots of a K-plate image is controlled, or alternatively it is acceptable that two or more phases of the phases of those halftone dots are independently controlled.

A user operates the slide bar b1 for a phase control through operations of the keyboard 103 and the mouse 104, while observing the halftone dot image c1 of color displayed on the phase control screen, to control the phase of halftone dots of the C-plate image, so that a Rosette pattern of halftone dots of the color halftone dot image to be finally printed by the printing machine can be controlled into a desired pattern from a Rosette pattern of the clear center (C.C) to a Rosette pattern of the dot center (D.C).

Further, a user operates the slide bar b1 for a phase control through operations of the keyboard 103 and the mouse 104, while varying the dot area percentage by the slide bar b2 for an alteration of dot area percentage, to control the phase of halftone dots of the C-plate image, while confirming Rosette patterns at various dot area percentages displayed on the phase control screen, so that a Rosette pattern of halftone dots of the color halftone dot image to be finally printed by the printing machine can be controlled into a desired pattern from a Rosette pattern of the clear center to a Rosette pattern of the dot center.

Figure 4:
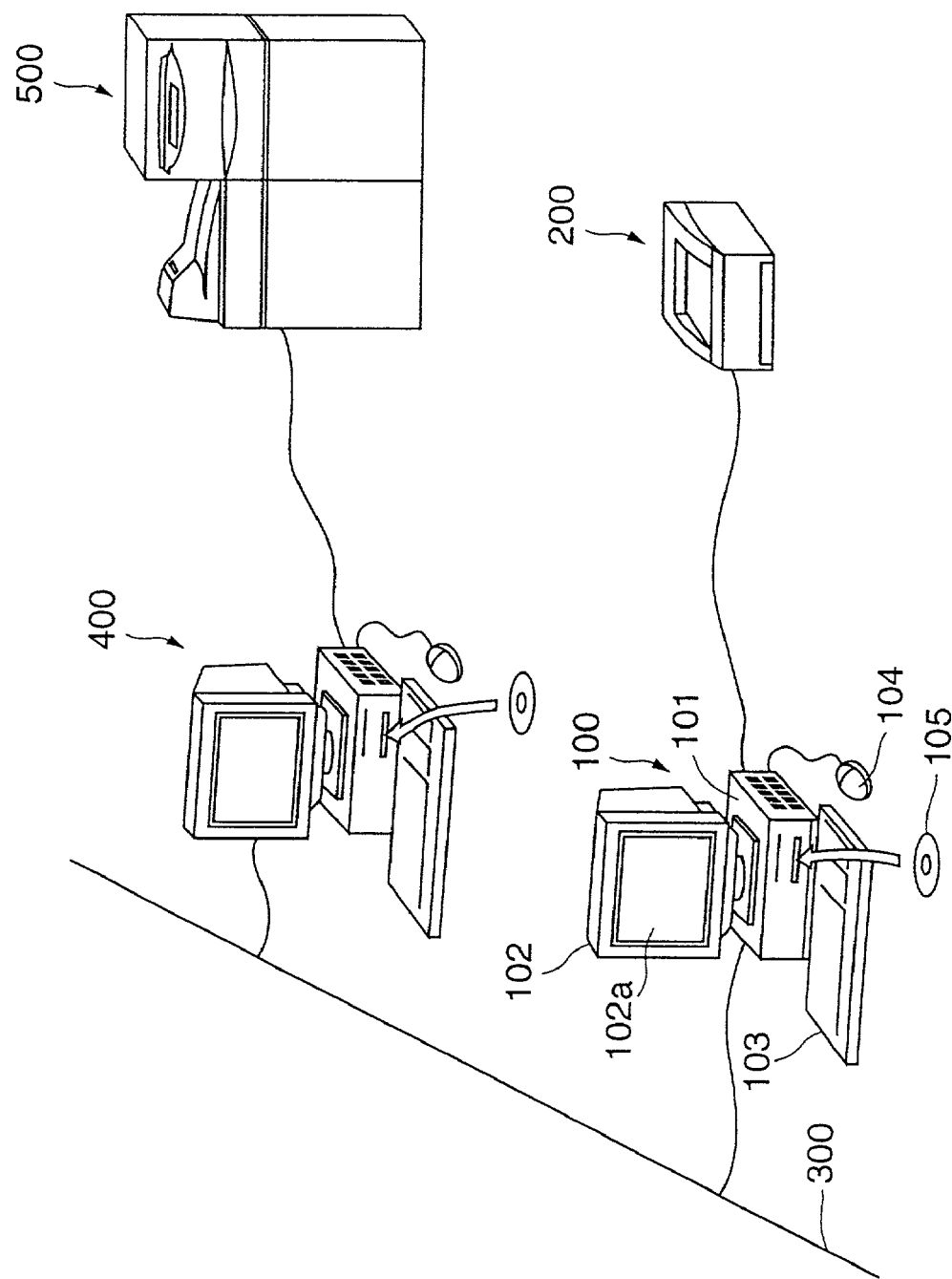
FIG. 4 is a view showing a proofer to which a halftone dot producing apparatus according to an embodiment of the present invention is applied, and a printing system.

FIG. 4 is a view showing a proofer to which a halftone dot producing apparatus according to an embodiment of the present invention is applied, and a printing system.

FIG. 4 shows a proofer comprising the halftone dot producing apparatus 100 and a printer 200, and a printing system comprising a computer system 400, a film setter 500, a printing plate printing machine (not illustrated), and a printing press (not illustrated). The halftone dot producing apparatus 100 and the computer system 400 are connected to each other via a communication network 300. The communication network 300 is connected also to an external computer system (not illustrated) other than the computer system 400.

Different points of the printing system shown in FIG. 4 from the printing system shown in FIG. 1 are that the computer system 400 does not correspond to the halftone dot producing apparatus of the present invention, but corresponds to the conventional halftone dot producing apparatus in which the above-mentioned dot phase control is not performed, and that the film setter 500 and the printing plate printing machine serve as the CTP 600 in the printing system shown in FIG. 1. The printing system using the film setter 500 and the printing plate printing machine, as shown in FIG. 4, is generally large in register discrepancy of images of color plates.

A proofer outputs a proof image, in which an image to be printed by a printing system is simulated, to confirm the finish of the image printed by the printing system beforehand. The halftone dot producing apparatus 100 of the proofer receives via the communication network 300 or a storage medium such as CD-R and MO multi-tone level image data for CMYK color plates which are the same as ones fed to the computer system 400, respectively. The inputted multi-tone level image data are converted by the halftone dot producing apparatus 100 into the halftone dot image data for the colors for a proof. The halftone dot image data for the colors for a proof thus converted are outputted to the printer 200. The printer 200 print-outputs a proof image of a color on a recording paper in accordance with the received halftone dot image data.

As the printer 200 connected to the halftone dot producing apparatus 100, particularly, an apparatus, which produces halftone dots through turning on and off an light emitting device such as LD and LED, for writing multiple colors of images on a single recording medium, is effective. There are raised by way of example an apparatus in which light sources of three colors of R, G, B are used to write CMYK of images into a silver salt sensitized material, and an apparatus in which such an operation that a donor sheet bears closely on an image receiving paper to be subjected to a laser exposure so that a color material is transferred onto the image receiving paper is repeated for YMCK of colors so as to produce a color image and finally transfer the same to a regular paper to obtain a color image.

On the halftone dot image printed by the printing machine shown in FIG. 4, usually, there appears no clear Rosette pattern owing to various register accuracy deterioration causes. Consequently, to provide an approximation to the actual printed matter, it is effective that data to which discrepancy corresponding to the deterioration in register accuracy is intentionally applied is used to print a proof image.

A user can control the phase of halftone dots of the images of colors represented by halftone dot image data for CMYK of colors generated by the halftone dot producing apparatus 100, while observing the phase control screen, in a similar fashion to that of halftone dot producing apparatus 100 of the printing system shown in FIG. 1. For example, the user controls the phase of halftone dots to reproduce a habit of register discrepancy in the printing system, referring to the halftone dot image printed before in the printing system. This feature makes it possible to print out a proof image in which the color image printed by the printing machine is reproduced at least on an approximation basis and also on a Rosette pattern involved in not only color but also halftone dots.

Hereinafter, there will be described in detail the halftone dot producing apparatus 100 wherein the phase of the halftone dots can be controlled on at least one color plate as mentioned above, which is used in both the printing system shown in FIG. 1 and the proofer shown in FIG. 4.

First, the hardware structure of the halftone dot producing apparatus 100, or the computer system 100 is as follows.

Figure 5:
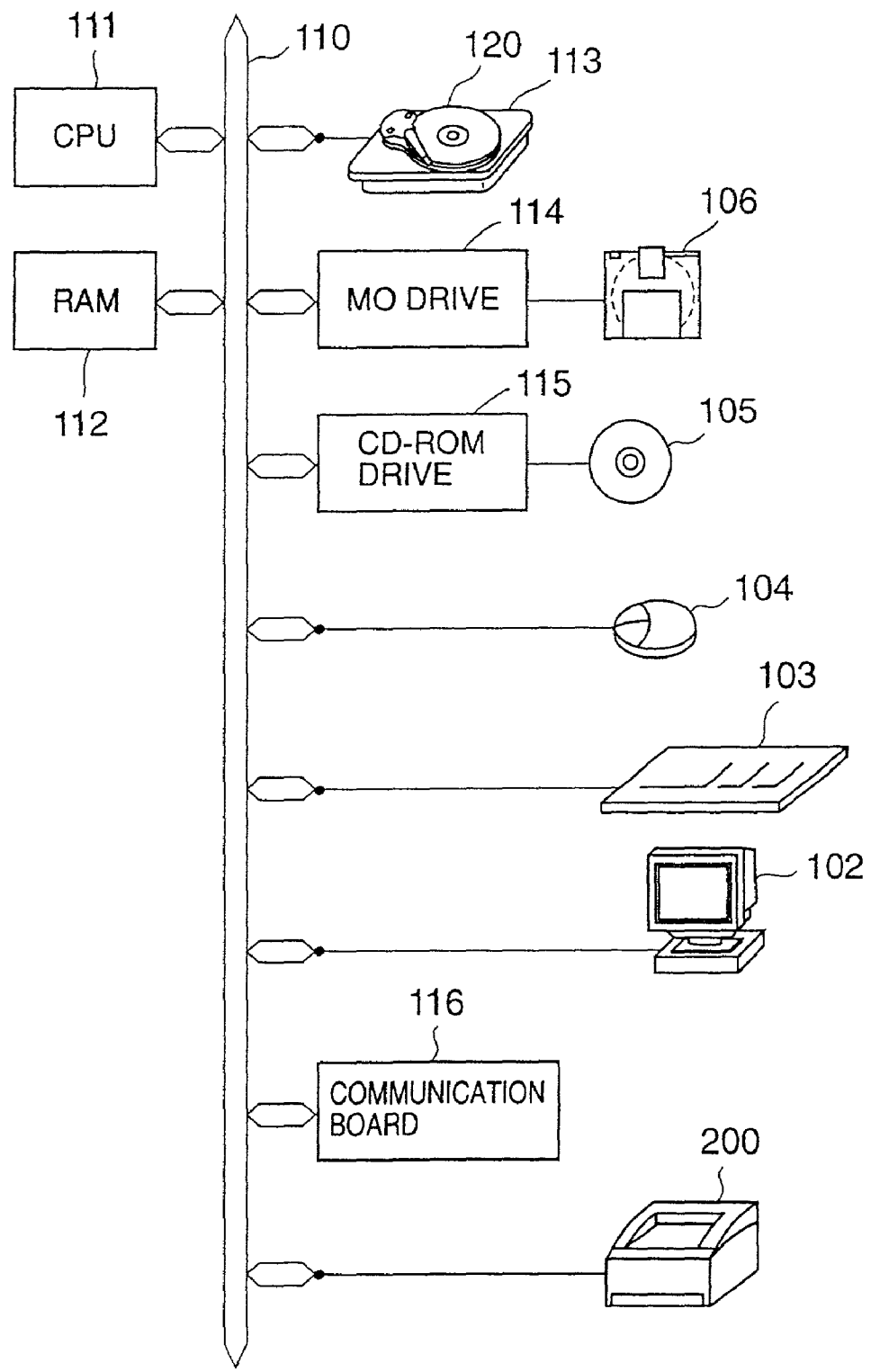
FIG. 5 is a hardware structural view of a computer system.

FIG. 5 is a hardware structural view of a computer system.

In the hardware structural view, there are shown a CPU (central processing unit) 111, RAM 112, HDD (a hard disk drive) 113, an MO drive 114, a CD-ROM drive 115 and a communication drive 116.

The HDD 113 incorporates therein a hard disk 120 which is a recording medium, and performs a recording reproduction for the magnetic disk 120.

The communication board 116 is connected to a communication line such as an LAN. The computer system 100 shown in FIG. 4 is able to perform a communication of data with a computer system 400 and other computer system as well by a communication network 300 connected via the communication board 116.

Further, FIG. 5 shows a mouse 104, a keyboard 103, a CRT display 102, and a printer 200, which are connected via a plurality of I/O interfaces (not illustrated) to a bus 110. With respect to the computer system 100 shown in FIG. 1, a CTP 600 (not illustrated in FIG. 5) instead of the printer 200 is connected via an I/O interface (not illustrated) to the bus 110.

Figure 6A:
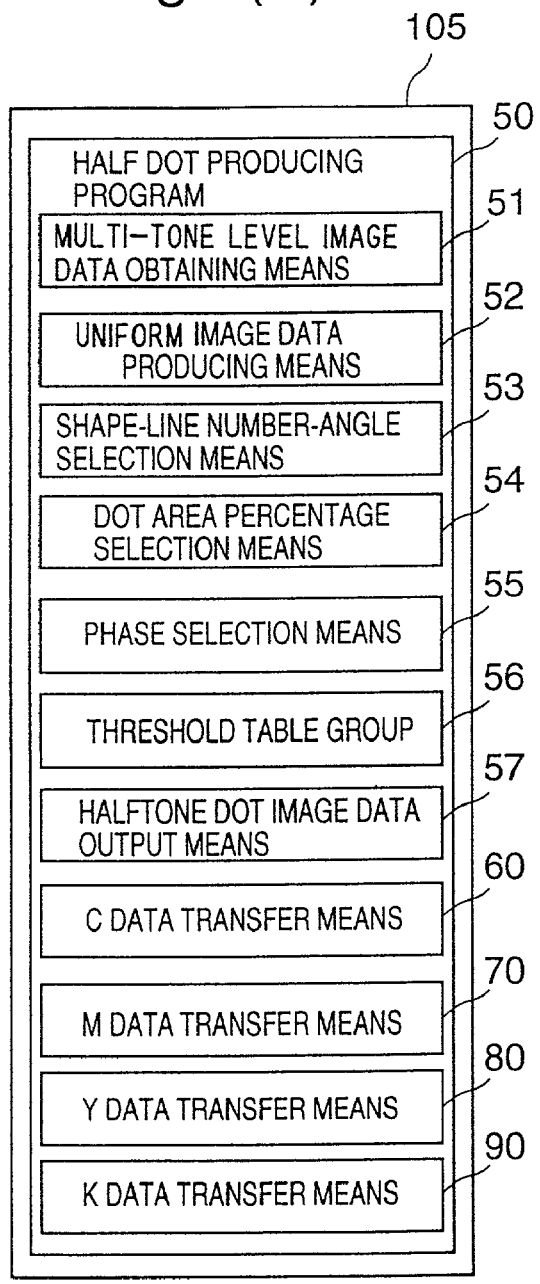
FIGS. 6(A) and 6(B) are views useful for understanding a halftone dot producing program storage medium according to an embodiment of the present invention.
Figure 6B:
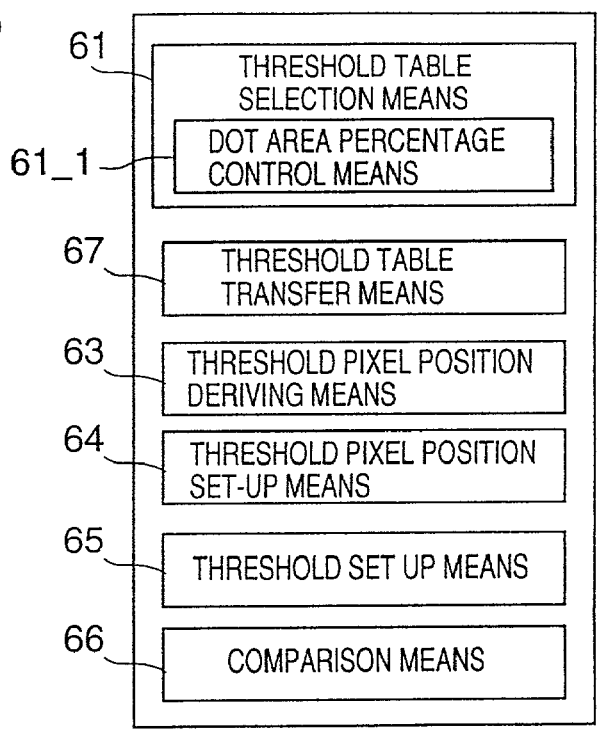

FIG. 6A–6B are views useful for understanding a halftone dot producing program storage medium according to an embodiment of the present invention.

According to the present embodiment, the CD-ROM 105 stores therein a halftone dot producing program. The CD-ROM 105, which stores the halftone dot producing program, corresponds to an embodiment of a halftone dot producing program storage medium referred to in the present invention.

A halftone dot producing program 50 stored in the CD-ROM 105 shown in part (A) of FIG. 6A includes, as a software, multi-tone level image data obtaining means 51, uniform image producing means 52, shape-line number-angle selection means 53, dot area percentage selection means 54, phase selection means 55, threshold table group 56, halftone dot image data output means 57, C-data conversion means 60, M-data conversion means 70, Y-data conversion means 80, and K-data conversion means 90. It is acceptable that those CMYK colors of data conversion means are replaced by a single data conversion means. The threshold table group 56 is a group of threshold tables involved in threshold data. The threshold table corresponds to the threshold matrix referred to in the present invention.

As shown in part (B) of FIG. 6B, the C-data conversion means 60 includes threshold table selection means 61, dot area percentage control means 61-1 included in the threshold table selection means 61, threshold table conversion means 67, image pixel position deriving means 63, threshold pixel position set up means 64, threshold set up means 65, and comparison means 66. While FIGS. 6A–6B show the threshold table conversion means 67, a halftone dot producing program, wherein the C-data conversion means 60 does not include the threshold table conversion means 67, is also one of the halftone dot producing programs according to the embodiment of the present invention. Further, according to the present embodiment, the M-data conversion means 70, the Y-data conversion means 80, the K-data conversion means 90 include the whole means included in the C-data conversion means 60, except for the threshold table conversion means 67. However, in the event that the phase control of the halftone dot is performed by the YMK colors data conversion means, it is acceptable that the YMK colors data conversion means include the threshold table conversion means 67.

According to the present embodiment, the comparison means for each of CMYK colors corresponds to the data producing means referred to in the present invention. In the event that the C-data conversion means 60 includes the threshold table conversion means 67, the threshold table conversion means 67 corresponds to the phase control means referred to in the present invention. On the other hand, in the event that the C-data conversion means 60 does not include the threshold table conversion means 67, the threshold pixel position set up means 64 corresponds to the phase control means referred to in the present invention.

The CD-ROM 105 is loaded on the main frame 101 so that the CD-ROM drive 115 reads the halftone dot producing program 50 stored in the CD-ROM 105. The halftone dot producing program 50 thus read is installed via the bus 110 into the hard disk 120.

When the halftone dot producing program 50 installed into the hard disk 120 is activated, the halftone dot producing program 50 in the hard disk 120 is loaded on the RAM 112 and is executed by the CPU 111. That is, in the computer system 100, there are implemented a multi-tone level image data obtaining section, a uniform image producing section, a shape-line number-angle selection section, a dot area percentage selection section, a phase selection section, a halftone dot image data output section, a C-data conversion section, an M-data conversion section, a Y-data conversion section, and a K-data conversion section, which comprise both a software and a hardware as the circumference for operating the software. The threshold table group 56 is stored in the hard disk 120. Details of the operation of those sections will be described later.

The halftone dot producing program 50 stored in the CD-ROM 105 is installed into the hard disk of the computer system 100. The hard disk into the halftone dot producing program is installed also corresponds to an embodiment of the halftone dot producing program storage medium of the present invention.

In the computer system 100 shown in FIGS. 1 and 4, the CD-ROM 105 is used as a program storage medium for storing the halftone dot producing program. However, the program storage medium referred to in the present invention is not restricted to the CD-ROM, and it is acceptable that the storage medium such as an optical disk, an MO, a floppy disk and a magnetic tape is used instead of CD-ROM. A program storage medium, which stores the halftone dot producing program, corresponds to an embodiment of the halftone dot producing program storage medium of the present invention.

Figure 7:
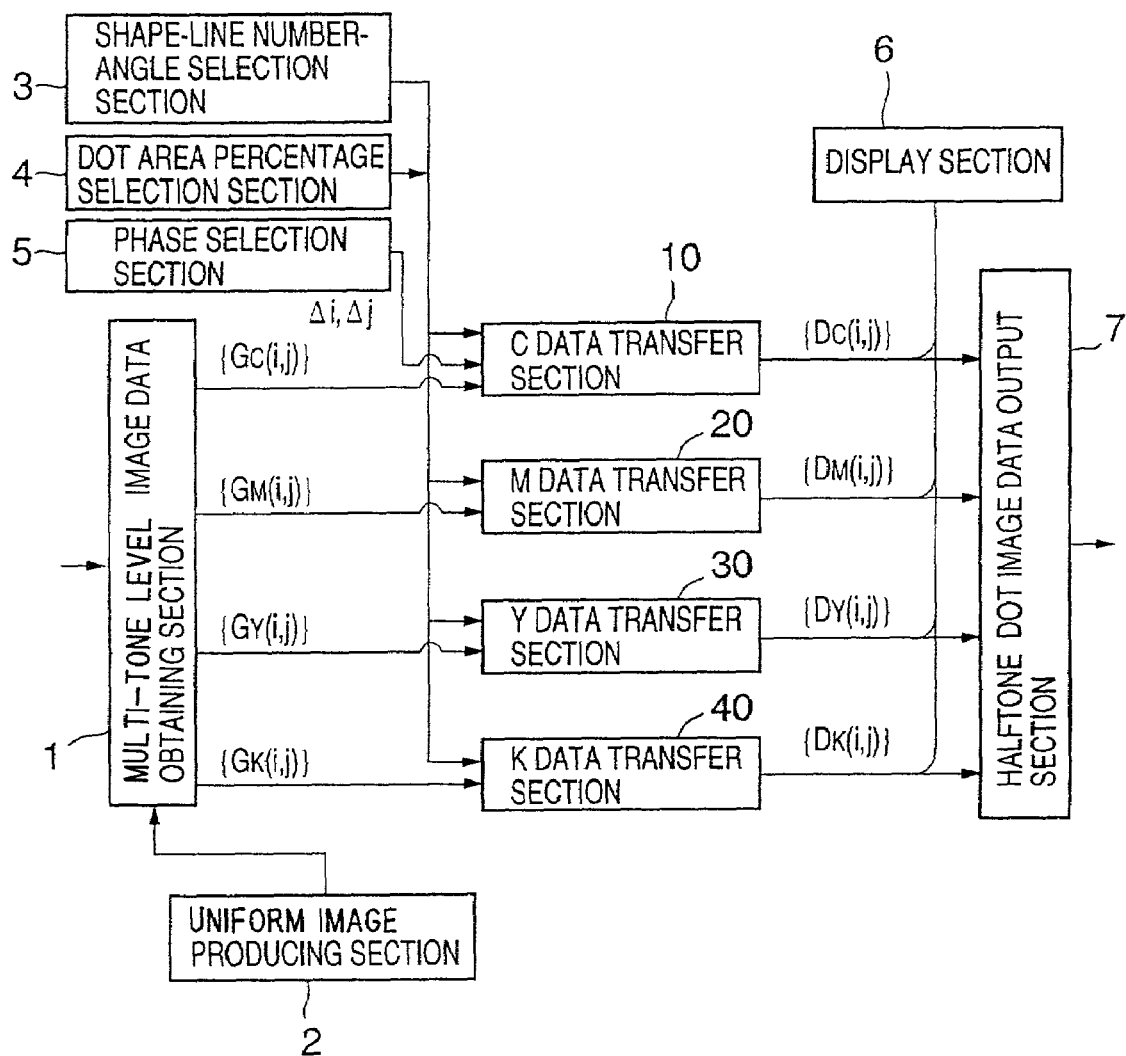
FIG. 7 is a schematic construction view of the halftone dot producing apparatus according to an embodiment of the present invention shown in FIGS. 1 and 4.

FIG. 7 is a schematic construction view of the halftone dot producing apparatus according to an embodiment of the present invention shown in FIGS. 1 and 4.

The halftone dot producing apparatus 100 shown in FIG. 7 comprises a multi-tone level image data obtaining section 1 for obtaining multi-tone level image data for CMYK color plates, a uniform image producing section 2 for generating multi-tone level image data for even density of CMYK color plates, a shape-line number-angle selection section 3 for selecting a shape, a line number and an angle of halftone dots, a dot area percentage selection section 4 for selecting a dot area percentage of halftone dots in case of a flat dot, a phase selection section 5 for selecting a phase of halftone dots, a C-data conversion section 10, an M-data conversion section 20, a Y-data conversion section 30, a K-data conversion section 40, those conversion sections 10, 20, 30 and 40 being for converting multi-tone level image data for CMYK color plates into halftone dot image data for CMYK color plates, respectively, a display section 6 corresponding to the display screen 102a for displaying images represented by the halftone dot image data for CMYK color plates, and a halftone dot image data output section 7 for outputting the halftone dot image data for CMYK color plates.

In the computer system 100, the multi-tone level image data obtaining section 1 obtains multi-tone level image data for CMYK color plates read through a scanner and the like. In the event that the Rosette pattern c2 is displayed on the halftone dot phase control screen, the multi-tone level image data obtaining section 1 obtains the multi-tone level image data for even density of CMYK color plates generated by the uniform image producing section 2. Hereinafter, multi-tone level image data for color plates are denoted by $\{G(i,j)\}$ as a set of individual multi-tone level image data having pixel value $G(i,j)$ in each pixel position $(i,j)$ Further, in FIG. 7, multi-tone level image data for C-plate image, multi-tone level image data for M-plate image, multi-tone level image data for Y-plate image, and multi-tone level image data for K-plate image are denoted by $\{G_C(i,j)\}$, $\{G_M(i,j)\}$, $\{G_Y(i,j)\}$, $\{G_K(i,j)\}$, respectively. Those multi-tone level image data $\{G_C(i,j)\}$, $\{G_M(i,j)\}$, $\{G_Y(i,j)\}$, and $\{G_K(i,j)\}$ are outputted by the multi-tone level image data obtaining section 1 to the C-data conversion section 10, the M-data conversion section 20, the Y-data conversion section 30, the K-data conversion section 40, respectively.

A dot shape, a line number and angles of halftone dots for color plates of halftone dots of halftone dot images represented by halftone dot image data converted and produced by the C-data conversion section 10, the M-data conversion section 20, the Y-data conversion section 30, the K-data conversion section 40 are selected in accordance with a predetermined operation of a user by the shape-line number-angle selection section 3.

In the event that the Rosette pattern c2 is displayed on the halftone dot phase control screen, dot area percentages of halftone dots of halftone dot images represented by halftone dot image data converted and produced by the above-mentioned four conversion sections are selected in accordance with a state of the slide bar b2 by the dot area percentage selection section 4.

Phase $(\Delta i, \Delta j)$ is selected by the phase selection section 5 in accordance with a state of the slide bar b1 in the halftone dot phase control screen. The Phase $(\Delta i, \Delta j)$ denotes a relative phase of halftone dots of the C-plate image with respect to phases wherein halftone dots of images for MYK color plates, of the halftone dot images represented by halftone dot image data converted by the above-mentioned four conversion sections, are fixed. The relative phase of halftone dots of the C-plate image is represented by coordinates of the pixel position.

The C-data conversion section 10 obtains multi-tone level image data $\{G_C(i,j)\}$ for C-plate image of the multi-tone level image data outputted from the multi-tone level image data obtaining section 1. The C-data conversion section 10 obtains the dot shape, a line number and angles of halftone dots selected by the shape-line number-angle selection section 3 and the phase $(\Delta i, \Delta j)$ selected by the phase selection section 5. In the even that the multi-tone level image data $\{G_C(i,j)\}$ outputted from the multi-tone level image data obtaining section 1 is the same as the multi-tone level image data for even density generated by the uniform image producing section 2, the C-data conversion section 10 obtains dot area percentages selected by the dot area percentage selection section 4. The multi-tone level image data $\{G_C(i,j)\}$ thus obtained is converted into halftone dot image data $\{D_C(i,j)\}$ by the C-data conversion section 10 in accordance with the dot shape, the line number and the angles and the phase $(\Delta i, \Delta j)$ thus obtained, and in accordance with the obtained dot area percentage in the event that the obtained multi-tone level image data $\{G_C(i,j)\}$ is the same as the multi-tone level image data for even density. The halftone dot image data $\{D_C(i,j)\}$ corresponds to halftone dot image data for C-plate of halftone dot image data $\{D(i,j)\}$ representative of a set of individual halftone dot image data having binary pixel value $D(i,j)$ in pixel position $(i,j)$.

Multi-tone level image data $\{G_M(i,j)\}$, $\{G_Y(i,j)\}$ and $\{G_K(i,j)\}$ outputted from the multi-tone level image data obtaining section 1 are obtained by the M-data conversion section 20, the Y-data conversion section 30, and the K-data conversion section 40, respectively. Further, those data conversion sections obtain the dot shape, the line number and angles of halftone dots selected by the shape-line number-angle selection section 3. In the even that the multi-tone level image data outputted from the multi-tone level image data obtaining section 1 is the same as the multi-tone level image data for even density generated by the uniform image producing section 2, those conversion sections obtain dot area percentages selected by the dot area percentage selection section 4. According to the present embodiment, the phase control is not performed for the M-plate image, the Y-plate image and K-plate image. Those three conversion sections do not obtain phases. As will be described later, multi-tone level image data $\{G_M(i,j)\}$, $\{G_Y(i,j)\}$ and $\{G_K(i,j)\}$ thus obtained are converted into halftone dot image data $\{D_M(i,j)\}$, $\{D_Y(i,j)\}$ and $\{D_K(i,j)\}$ by the M-data conversion section 20, the Y-data conversion section 30 and the K-data conversion section 40, respectively in accordance with the dot shape, the line number and the angles thus obtained, and in accordance with the obtained dot area percentage in the event that the obtained multi-tone level image data is the same as the multi-tone level image data for even density. The halftone dot image data $\{D_M(i,j)\}$, $\{D_Y(i,j)\}$ and $\{D_K(i,j)\}$ represent halftone dot image data for M-plate, halftone dot image data for Y-plate, and halftone dot image data for K-plate, in a similar fashion to that of halftone dot image data $\{D_C(i,j)\}$.

Those halftone dot image data $\{D_C(i,j)\}$, $\{D_M(i,j)\}$, $\{D_Y(i,j)\}$ and $\{D_K(i,j)\}$ are fed to the halftone dot image data output section 7, outputted from the halftone dot image data output section 7, and transmitted to the CTP 600 and the printer 200.

Further, those halftone dot image data $\{D_C(i,j)\}$, $\{D_M(i,j)\}$, $\{D_Y(i,j)\}$ and $\{D_K(i,j)\}$ are fed to the display section 6. The display section 6 displays the halftone dot image on the halftone dot phase control screen in accordance with halftone dot image data.

Next, there will be described the internal structure of the C-data conversion section 10, the M-data conversion section 20, the Y-data conversion section 30, and the K-data conversion section 40, and details of the conversion of those conversion sections as well.

Figure 8:
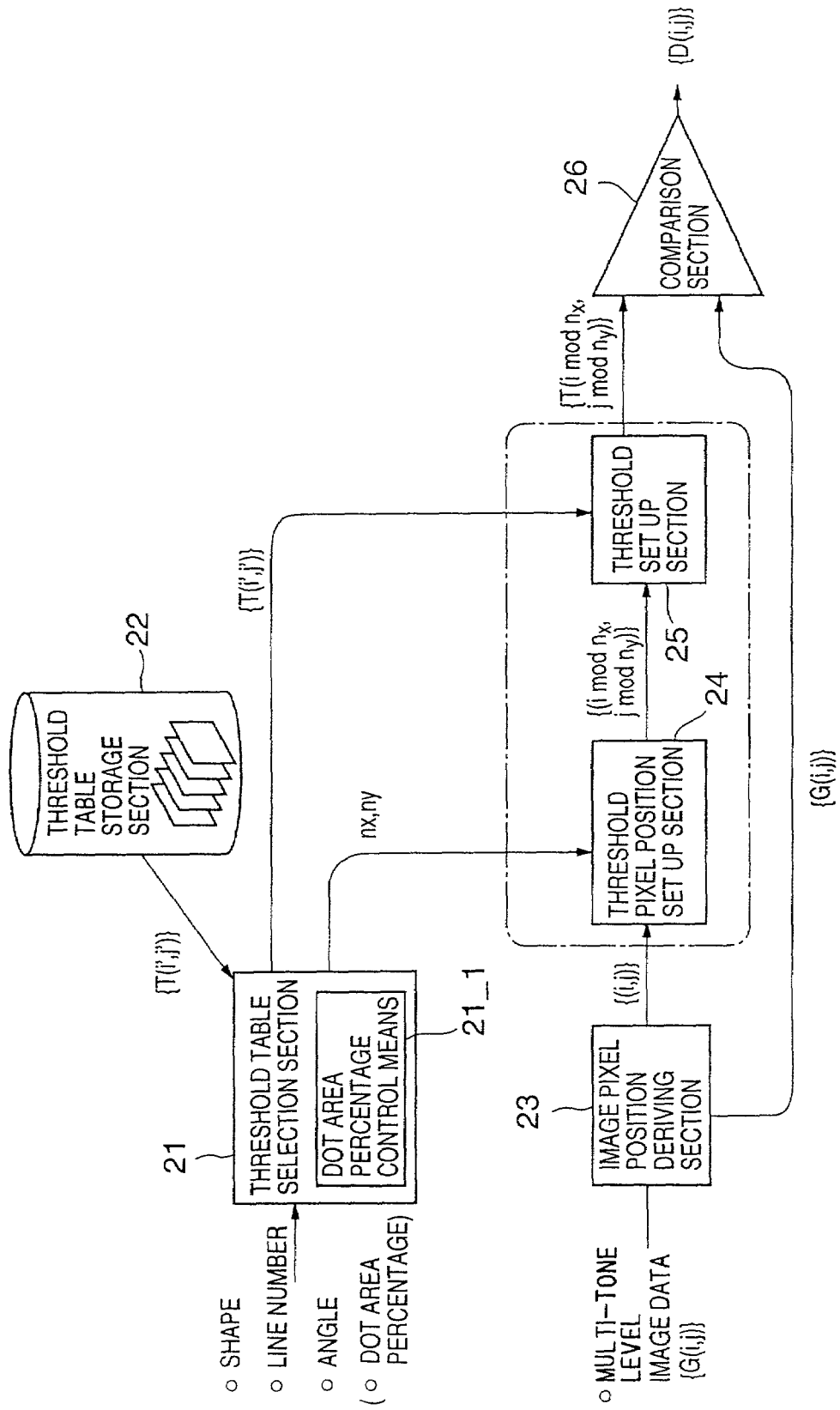
FIG. 8 is a schematic construction view of an M data conversion section in the halftone dot producing apparatus according to an embodiment of the present invention shown in FIG. 7.

FIG. 8 is a schematic construction view of an M-data conversion section in the halftone dot producing apparatus according to an embodiment of the present invention shown in FIG. 7.

While FIG. 8 shows a structure of the M-data conversion section 20, the Y-data conversion section 30 and K-data conversion section 40 have the same structure of the M-data conversion section 20. As seen from that those MYK data conversion sections does not apply any operation to the phase of halftone dots as mentioned above, those MYK data conversion sections have the same structure of the data conversion section of the conventional halftone dot producing apparatus.

The M-data conversion section 20 shown in FIG. 8 comprises: a threshold table storage section 22, which is equivalent to the hard disk 120 storing the threshold table group in the CD-ROM 105 shown in FIG. 6A; a threshold table selection section 21 for selecting a threshold table from the threshold table storage section 22, said threshold table selection section 21 including dot area percentage control means 21-1; an image pixel position deriving section 23; a threshold pixel position setting section 24; a threshold setting section 25; and a comparison section 26. The image pixel position deriving section 23, the threshold pixel position setting section 24, the threshold setting section 25, and the comparison section 26 are for converting multi-tone level image data {G (i, j)} into halftone dot image data {D (i, j)} using the selected threshold table by the threshold table selection section 21. The threshold table selection section 21, and those sections 23, 24, 25 and 26 for converting multi-tone level image data {G (i, j)} into halftone dot image data {D(i, j)} are operated in accordance with the flowchart shown in FIG. 9.

Figure 9:
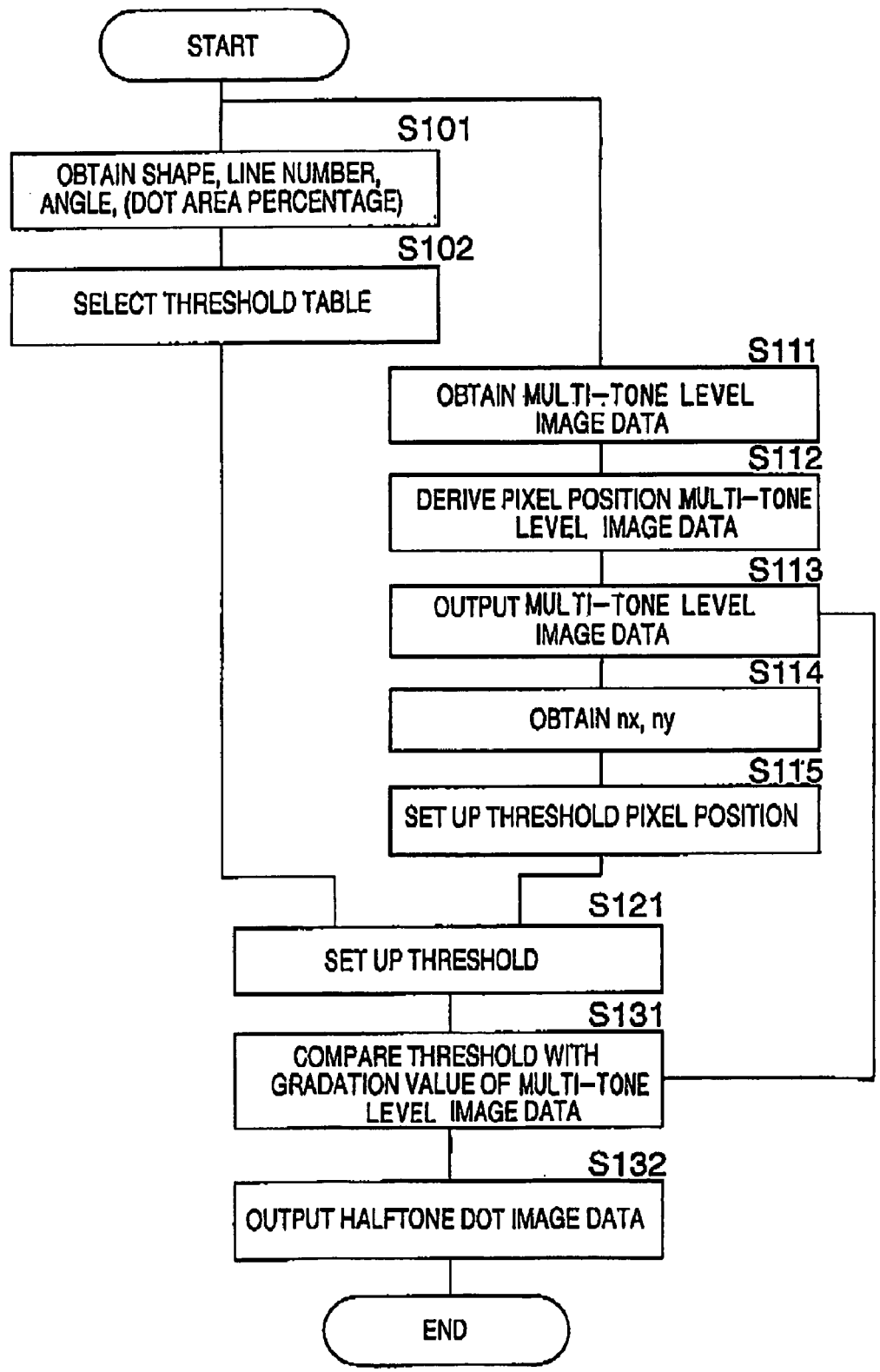
FIG. 9 is a flowchart useful for understanding a conversion from multi-tone level image data to halftone dot image data in the M data conversion section shown in FIG. 8.

FIG. 9 is a flowchart useful for understanding a conversion from multi-tone level image data to halftone dot image data in the M data conversion section shown in FIG. 8.

In step S101, the threshold table selection section 21 obtains the dot shape, a line number and angles of halftone dots selected by the shape-line number-angle selection section 3 shown in FIG. 7. In the event that the Rosette pattern c2 is displayed on the halftone dot phase control screen of the display section 6, the dot area percentage control means 21-1 of the threshold table selection section 21 obtains the dot area percentage selected by the dot area percentage selection section 4 shown in FIG. 7. Next, the process goes to a step S102.

In the step S102, the threshold table selection section 21 derives threshold table {T (i', j')} from the threshold table storage section 22 in accordance with the dot shape, a line number and angles obtained in the step S101. In the event that the dot area percentage control means 21-1 obtains the dot area percentage, the dot area percentage control means 21-1 controls thresholds of the threshold table derived by the threshold table selection section 21 so as to produce a new threshold table {T (i', j')} to generate halftone dot image data representative of the image of the dot area percentage. Incidentally, it is acceptable that the halftone dot producing apparatus controls, but does not control the thresholds of the threshold table as mentioned above, an uniform image of density level in such a manner that data of the dot area percentage is transferred to the uniform image producing section 2 shown in FIG. 7 so that a density level of the uniform image produced by the uniform image producing section 2 is controlled.

On the other hand, in parallel to the step S101 and step S102, steps S111 to S115 advance.

In the step S111, the image pixel position deriving section 23 obtains the multi-tone level image data {G (i, j)} outputted from the multi-tone level image data obtaining section 1 shown in FIG. 7. Next, the process goes to the step S112.

In the step S112, the image pixel position deriving section 23 derives data {(i, j)} of a pixel position from the obtained multi-tone level image data {G (i, j)}. The data {(i, j)} denotes an assembly of data of pixel positions (i, j) and includes information of the association between the pixel positions (i, j) and pixel values G (i, j) of the gradation image data {G (i, j)}. Next, the process goes to the step S113.

In the step S113, the image pixel position deriving section 23 causes the data {(i, j)} of a pixel position to be outputted to the threshold pixel position setting section 24 so that the gradation image data {G (i, j)} is outputted to the comparison section 26. Next, the process goes to steps S114, S115 and S121.

Next, there will be described a set up of threshold pixel position and a set up of threshold in the steps S114, S115 and S121 in conjunction with FIG. 10.

Figure 10:
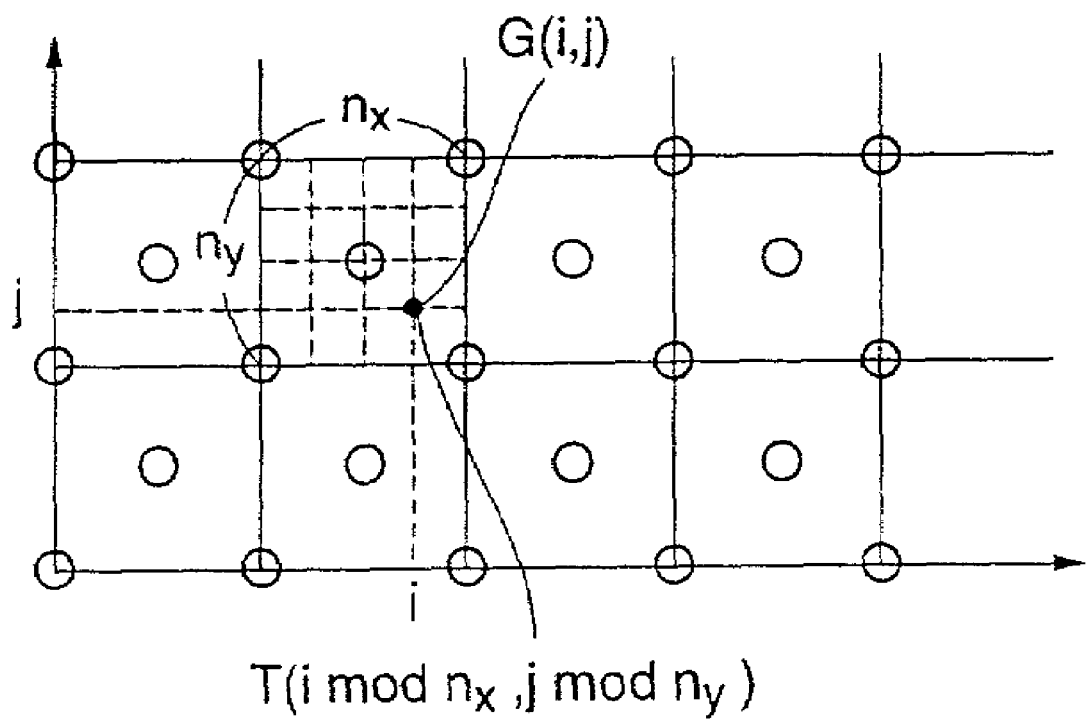
FIG. 10 is a view showing the association between the multi-tone level image data in a pixel plane and a threshold table.

FIG. 10 is a view showing the association between the multi-tone level image data in a pixel plane and a threshold table.

FIG. 10 shows a pixel plane in which pixels are arranged on a two-dimensional basis. A pixel position is indicated by a cross point of two lines typically only in a rectangle (square) of the rectangles (squares) encircled with solid lines. The pixel values G (i, j) are defined by the pixel positions (i, j).

Each of the rectangles (squares) encircled with solid lines represents an area associated with the threshold table {T (i', j')}, and has a size of horizontal $n_x$ pixel x vertical $n_y$ pixel. Thresholds T (i', j') of the threshold table {T (i', j')} are associated with the relative pixel positions (i', j') of the rectangle. Since the areas of the rectangle are periodically placed, the relative pixel positions (i', j') are denoted by (i mod $n_x$, j mod $n_y$). Thus, thresholds associated with the pixel positions (i, j) corresponding to the pixel values G (i, j) are expressed by thresholds T (i mod $n_x$, j mod $n_y$), and threshold tables are expressed by {T (i mod $n_x$, j mod $n_y$)}.

A size of the area associated with the threshold table shown in FIG. 10 corresponds to a two-dot cell of size. A center of the rectangle representative of the area and white circles of four vertexes of the rectangle shown in FIG. 10 represent an example of halftone dots appearing on the area. Here, an angle of the halftone dot is 45°.

In the step S114, the threshold pixel position setting section 24 obtains $n_x$ and $n_y$ which define an area associated with the threshold table selected by the threshold table selection section 21. Next, the process goes to the step S115.

In the step S115, the threshold pixel position setting section 24 sets up data {(i mod $n_x$, j mod $n_y$)} of the pixel positions (i mod $n_x$, j mod $n_y$), that is, the relative pixel positions (i', j') associated with the pixel values G (i, j) defined by the pixel positions (i, j) in accordance with $n_x$ and $n_y$ thus obtained. Next, the process goes to the step S121.

In the step S121, first, data {(i mod $n_x$, j mo d $n_y$)} of the relative pixel positions (i mod $n_x$, j mo d $n_y$) associated with the pixel values G (i, j), which is obtained in the step S115, and the threshold table {T (i', j')} selected and produced by the threshold table selection section 21 in the step S102 are fed to the threshold setting section 25. The threshold setting section 25 determines the thresholds T (i mod $n_x$, j mo d $n_y$) at the relative pixel positions (i mod $n_x$, j mod $n_y$) associated with the pixel values G (i, j), of the thus entered data, and outputs the threshold tables {T (i mod $n_x$, j mod $n_y$)} representative of the thresholds associated with the pixel values G (i, j). Next, the process goes to steps S131 to S132.

In the steps S131 to S132, first, the threshold tables {T (i mod $n_x$, j mod $n_y$)} representative of the thresholds associated with the pixel values G (i, j) and the multi-tone level image data {G (i, j)} outputted by the image pixel position deriving section 23 in the step S113 are fed to the comparison section 26. The comparison section 26 compares the pixel values G (i, j) with the thresholds T (i mod $n_x$, j mod $n_y$). In the pixel positions (i, j), in the event that the pixel value G is not less than the threshold T, the maximum pixel value is applied to the new pixel value D (i, j) at the pixel positions (i, j) In the event that the pixel value G is not much than the threshold T, the minimum pixel value is applied to the pixel value D (i, j). Thus, the halftone dot image data {D (i, j)} composed of the pixel value D (i, j) is produced. The halftone dot image data {D (i, j)} thus produced is outputted to the halftone dot image data output section 7 and the display section 6 shown in FIG. 7.

Figure 11:
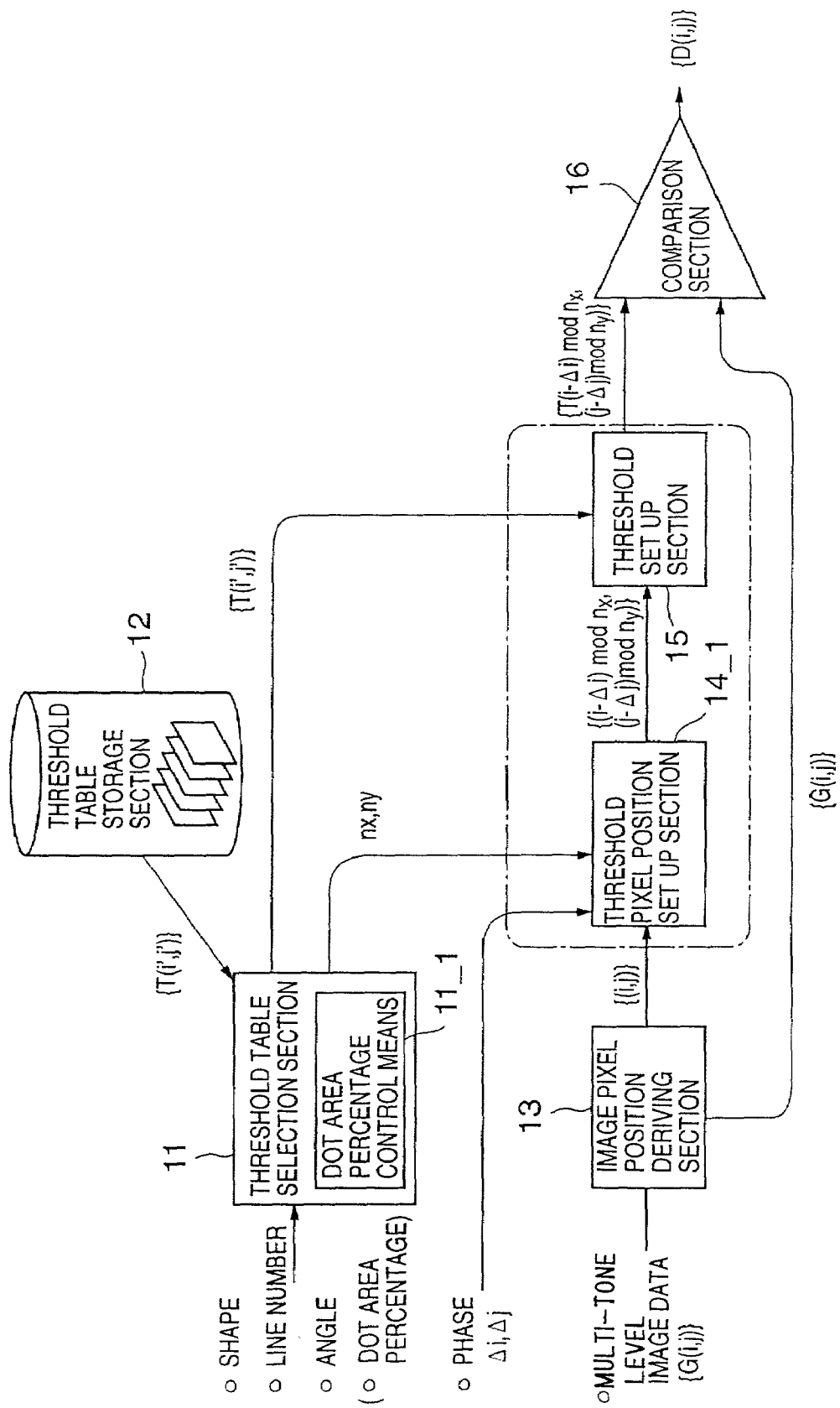
FIG. 11 is a schematic construction view of a first C data conversion section which is an one embodiment of a C data conversion section in the halftone dot producing apparatus according to an embodiment of the present invention shown in FIG. 7.

FIG. 11 is a schematic construction view of a first C data conversion section which is an one embodiment of a C-data conversion section in the halftone dot producing apparatus according to an embodiment of the present invention shown in FIG. 7.

According to the present embodiment, a first C-data conversion section 10-1 and a second C-data conversion section (which will be described later) serve as a portion for generating a shift of the phase of the halftone dots.

The first C-data conversion section 10-1 comprises, similar to the M-data conversion section 20 shown in FIG. 8, a threshold table storage section 12; a threshold table selection section 11 including dot area percentage control means 11-1; an image pixel position deriving section 13; a threshold pixel position setting section 14-1; a threshold setting section 15; and a comparison section 16. Of those sections and means, the threshold table selection section 11, the dot area percentage control means 11-1, and the image pixel position deriving section 13 are the same as those of the M-data conversion section 20 in their operation. Also with respect to the threshold setting section 15 and the comparison section 16, they are the same as those of the M-data conversion section 20 in their operation, but different in contents of data to be dealt. However, the threshold pixel position setting section 14-1 is different from the threshold pixel position setting section 24 in the M-data conversion section 20, and is to generate the phase shift of halftone dots. In the first C-data conversion section 10-1, the threshold pixel position setting section 14-1 corresponds to the phase control section referred to in the present invention. And the comparison section 16 corresponds to the data producing section referred to in the present invention.

Figure 12:
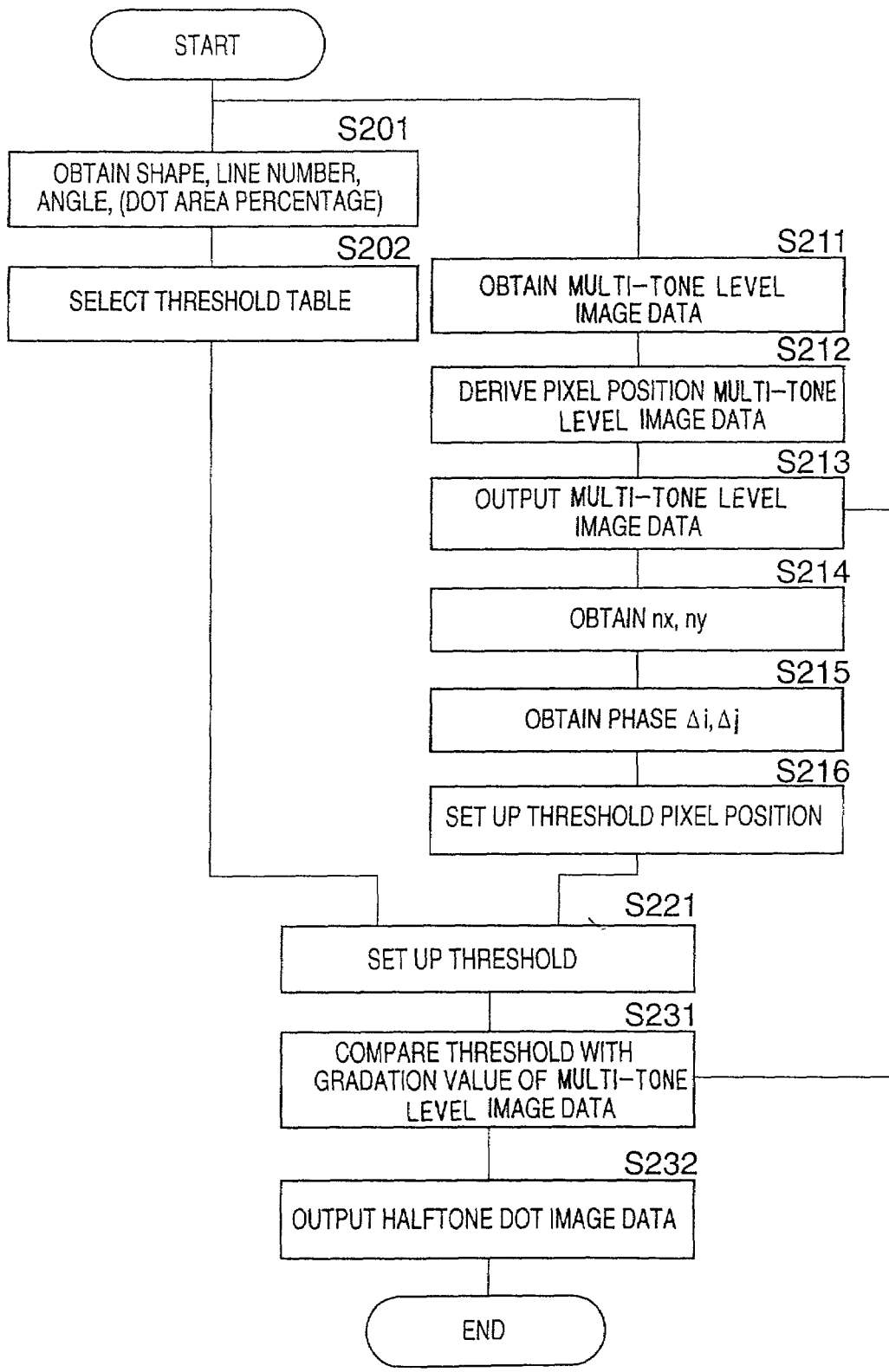
FIG. 12 is a flowchart useful for understanding a conversion from multi-tone level image data to halftone dot image data in the first C data conversion section shown in FIG. 11.

The first C-data conversion section 10-1 operates in accordance with the flowchart shown in FIG. 12.

FIG. 12 is a flowchart useful for understanding a conversion from multi-tone level image data to halftone dot image data in the first C-data conversion section shown in FIG. 11.

Steps S201 to S202, and steps 211 to S214 advance in a similar fashion to the steps S101 to S102, and steps 111 to S114 of the flowchart shown in FIG. 9. Subsequent to the step S214, the process goes to step S215.

In the step S215, the phase ($\Delta i$, $\Delta j$), which is selected by the phase selection section 5, is entered through the threshold pixel position setting section 14-1.

Figure 13A:
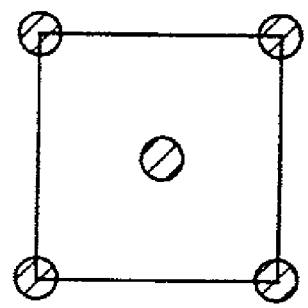
FIGS. 13(A) and (B) are views each showing a phase of halftone dots.

FIGS. 13(A) and (B) are views each showing a phase of halftone dots.

Figure 13B:
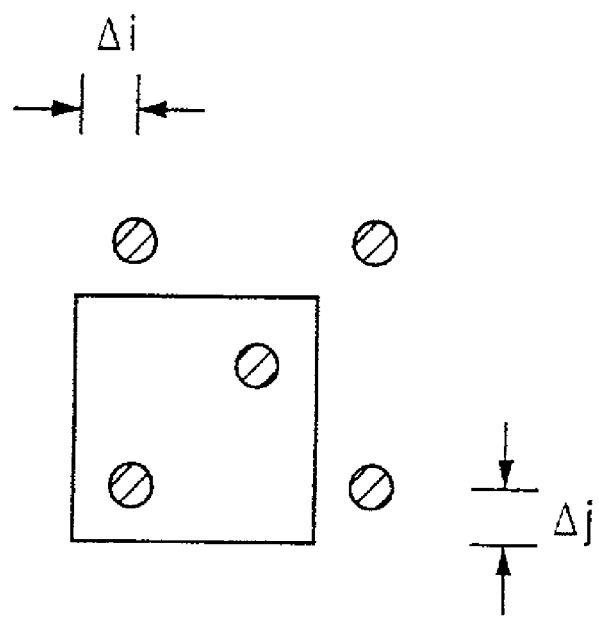

In both FIG. 13(A) and FIG. 13(B), also as shown in FIG. 10, the rectangle (square) represents an area associated with a threshold table, and a circle with a slash represents a halftone dot. FIG. 13(A) shows an example of halftone dots free from the phase shift. In FIG. 13(A), halftone dots locate at the center of the rectangle and four vertexes of the rectangle. FIG. 13(B) shows halftone dots in a case where the phase is shifted by ($\Delta i$, $\Delta j$). In FIG. 13(B), the halftone dots are located at the positions shifted from the positions shown in FIG. 13(A) (A) in the upper right direction.

Such a phase shift of halftone dots is introduced into data of the pixel position shown in the subsequent step S216. Next, the process goes to the step S216.

In the step S216, first, the threshold pixel position setting section 14-1 alters the pixel position associated with the pixel values G (i, j) to the pixel position (i−$\Delta i$, j−$\Delta j$) in accordance with the obtained phase ($\Delta i$, $\Delta j$). In a similar fashion to that of the step S116 of the flowchart shown in FIG. 9, the threshold pixel position setting section 14-1 sets up data {((i−$\Delta i$) mod $n_x$, (j−$\Delta j$) mod $n_y$)} of the relative pixel position (i', j')=((i−$\Delta i$) mod $n_x$, (j−$\Delta j$) mod $n_y$) in a rectangular area associated with the threshold table, associated with the pixel values G (i, j) or the pixel position (i−$\Delta i$, j−$\Delta j$), in accordance with the obtained $n_x$ and $n_y$.

In this manner, a matter that the pixel positions (i, j) associated with the pixel values G (i, j) are altered within the areas associated with the threshold tables means that the phase of the multi-tone level image data {G (i, j)} to the threshold table {T (i', j')} is controlled. Next, the process goes to step S221.

In the step S221, as compared with the step S121 shown in FIG. 9, the same data processing is performed but different in data. That is, data {((i−$\Delta i$) mod $n_x$, (j−$\Delta j$) mod $n_y$)} of the relative pixel position ((i−$\Delta i$) mod $n_x$, (j−$\Delta j$) mod $n_y$) associated with the pixel values G (i, j), and the threshold table {T (i', j')} selected and produced by the threshold table selection section 11 in the step S202 are fed to the threshold setting section 15. The threshold setting section 15 determines the thresholds T ((i−$\Delta i$) mod $n_x$, (j−$\Delta j$) mod $n_y$) of the threshold table at the relative pixel positions ((i−$\Delta i$) mod $n_x$, (j−$\Delta j$) mod $n_y$) associated with the pixel values G (i, j), of the thus entered data, and outputs the threshold tables {T ((i−$\Delta i$) mod $n_x$, (j−$\Delta j$) mod $n_y$)} representative of the thresholds associated with the pixel values G (i, j). Next, the process goes to steps S231 to S232.

In the steps S231 to S232, as compared with the steps 131 to 132 shown in FIG. 9, the same data processing is performed but different in the entered threshold, and as a result, the outputted halftone dot image data {D (i, j)} is different. That is, first, the threshold tables {T ((i−$\Delta i$) mod $n_x$, (j−$\Delta j$) mod $n_y$)} representative of the thresholds associated with the pixel values G (i, j) and the multi-tone level image data {G (i, j)} outputted by the image pixel position deriving section 13 in the step S213 are fed to the comparison section 16. The comparison section 16 compares the pixel values G (i, j) with the thresholds T ((i−$\Delta i$) mod $n_x$, (j−$\Delta j$) mod $n_y$). In the pixel positions (i, j), in the event that the pixel value G is not less than the threshold T, the maximum pixel value is applied to the new pixel value D (i, j) at the pixel positions (i, j). In the event that the pixel value G is not much than the threshold T, the minimum pixel value is applied to the pixel value D (i, j). Thus, the halftone dot image data {D (i, j)} is produced.

Here, the thresholds T ((i−$\Delta i$) mod $n_x$, (j−$\Delta j$) mod $n_y$) to be compared with the pixel values G (i, j) include a shift of the phase ($\Delta i$, $\Delta j$). The position (i, j) wherein the maximum pixel value is given for the value D (i, j), that is, the pixel position involved in the halftone dot of a C-plate of halftone dot image, is shifted by the phase ($\Delta i$, $\Delta j$) with respect to the pixel position of halftone dots represented by halftone dot image data for M-plate, Y-plate and K-plate produced by the M, Y, K data conversion sections.

The halftone dot image data {D (i, j)} thus produced is outputted to the halftone dot image data output section 7 and the display section 6 shown in FIG. 7.

FIG. 14 is a schematic construction view of a second C-data conversion section which is an one embodiment of a C data conversion section in the halftone dot producing apparatus according to an embodiment of the present invention shown in FIG. 7.

The second C-data conversion section 10-2 shown in FIG. 14 comprises: a threshold table storage section 12; a threshold table selection section 11 including dot area percentage control means 11-1; an image pixel position deriving section 13; a threshold pixel position setting section 14-2; a threshold setting section 15; and a comparison section 16, those sections constituting the first C-data conversion section 10-1 shown in FIG. 11; and a threshold table conversion section 17 which is peculiar to the second C-data conversion section 10-2.

Of those sections and means, the threshold table selection section 11, the dot area percentage control means 11-1, and the image pixel position deriving section 13 are the same as those of the M-data conversion section 20 in their operation. Also with respect to the threshold setting section 15 and the comparison section 16, they are the same as those of the M-data conversion section 20 in their operation, but different in contents of data to be dealt.

However, in the second C-data conversion section 10-2, the threshold table conversion section 17 generates the phase shift of halftone dots. In the second C-data conversion section 10-2, the threshold table conversion section 17 corresponds to the phase control section referred to in the present invention. And the comparison section 16 corresponds to the data producing section referred to in the present invention.

Figure 15:
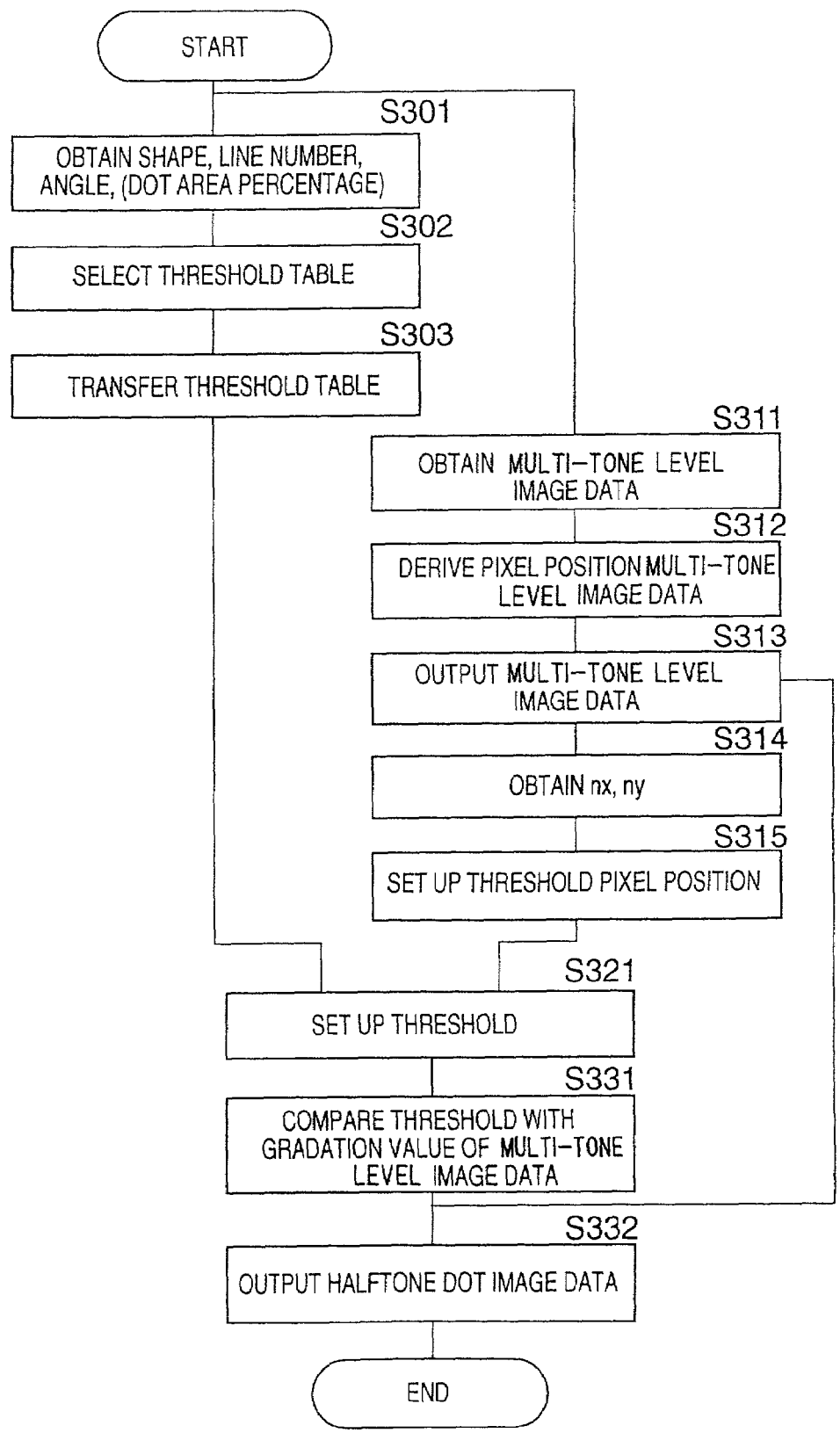
FIG. 15 is a flowchart useful for understanding a conversion from multi-tone level image data to halftone dot image data in the second C data conversion section shown in FIG. 14.

The second C-data conversion section 10-2 operates in accordance with the flowchart shown in FIG. 15.

FIG. 15 is a flowchart useful for understanding a conversion from multi-tone level image data to halftone dot image data in the second C-data conversion section shown in FIG. 14.

Steps S301 to S302, and steps 311 to S314 advance in a similar fashion to the steps S101 to S102, and steps 111 to S115 of the flowchart shown in FIG. 9. Subsequent to the step S302, the process goes to step S303. Subsequent to the step S315, the process goes to step S321.

In the step S303, the threshold table conversion section 17 receives the threshold table selected by the threshold table selection section 11, or the threshold table $\{T(i', j')\}$, which is newly produced by the dot area percentage control means 11-1 in accordance with the table selected by the threshold table selection section 11, and further receives the phase ($\Delta i$, $\Delta j$) selected by the phase selection section 5. The threshold table conversion section 17 alters the threshold of the threshold table associated with the pixel position (i', j') of the threshold table from the threshold $T(i', j')$ to the threshold $T((i'-\Delta i) \bmod n_x, (j'-\Delta j) \bmod n_y)$ in the pixel position shifted by the entered phase ($\Delta i$, $\Delta j$). Following such an alteration, the threshold table conversion section 17 converts the threshold table $\{T(i', j')\}$ to the new threshold table $\{T((i'-\Delta i) \bmod n_x, (j'-\Delta j) \bmod n_y)\}$. Such an alteration of the threshold table according to the phase ($\Delta i$, $\Delta j$) means a phase control of the image data threshold table $\{T(i', j')\}$ to the multi-tone level image data $\{G(i, j)\}$. Next, the process goes to step S321.

In the step S321, as compared with the step S121 shown in FIG. 9, the same data processing is performed but different in data. That is, pixel position data $\{(i \bmod n_x, j \bmod n_y)\}$ of the relative pixel position ($i \bmod n_x$, $\bmod n_y$) in an area associated with the threshold table as shown in FIG. 10, associated with the pixel values G (i, j), set up by the threshold pixel position setting section 14-2, and the threshold table $\{T((i'-\Delta i) \bmod n_x, (j'-\Delta j) \bmod n_y)\}$ converted by the threshold table conversion section 17 in the step S303 are fed to the threshold setting section 15. The threshold setting section 15 determines the thresholds $T((i-\Delta i) \bmod n_x, (j-\Delta j) \bmod n_y)$ of the threshold table at the relative pixel positions ($i \bmod n_x$, $j \bmod n_y$) associated with the pixel values G (i, j), and outputs the threshold tables $\{T((i-\Delta i) \bmod n_x, (j-\Delta j) \bmod n_y)\}$ representative of the thresholds associated with the pixel values G (i, j) Next, the process goes to steps S331 to S332.

In the steps S331 to S332, in a similar fashion to that of the steps 231 to 232 shown in FIG. 12, the threshold tables $\{T((i-\Delta i) \bmod n_x, (j-\Delta j) \bmod n_y)\}$ representative of the thresholds associated with the pixel values G (i, j) and the multi-tone level image data $\{G(i, j)\}$ outputted by the image pixel position deriving section 13 in the step S313 are fed to the comparison section 16. The comparison section 16 compares the pixel values G (i, j) with the thresholds $T((i-\Delta i) \bmod n_x, (j-\Delta j) \bmod n_y)$. Thus, the halftone dot image data $\{D(i, j)\}$ is produced.

The halftone dot image data $\{D(i, j)\}$ thus produced is outputted to the halftone dot image data output section 7 and the display section 6 shown in FIG. 7.

The pixel position involved in the halftone dot of a C-plate of halftone dot image represented by the halftone dot image data $\{D(i, j)\}$ is shifted by the phase ($\Delta i$, $\Delta j$) with respect to the pixel position of halftone dots represented by halftone dot image data for M-plate, Y-plate and K-plate produced by the M, Y, K data conversion sections.

Here, there will be terminated the explanation of the structure of the halftone dot producing apparatus 100 and the operation thereof, for performing the phase control of color plates, particularly the phase control of a C-plate of halftone dot image to MYK color plates of halftone dot images, and next, there will be explained a state of Rosette patterns implemented by such a phase control.

Figure 16:
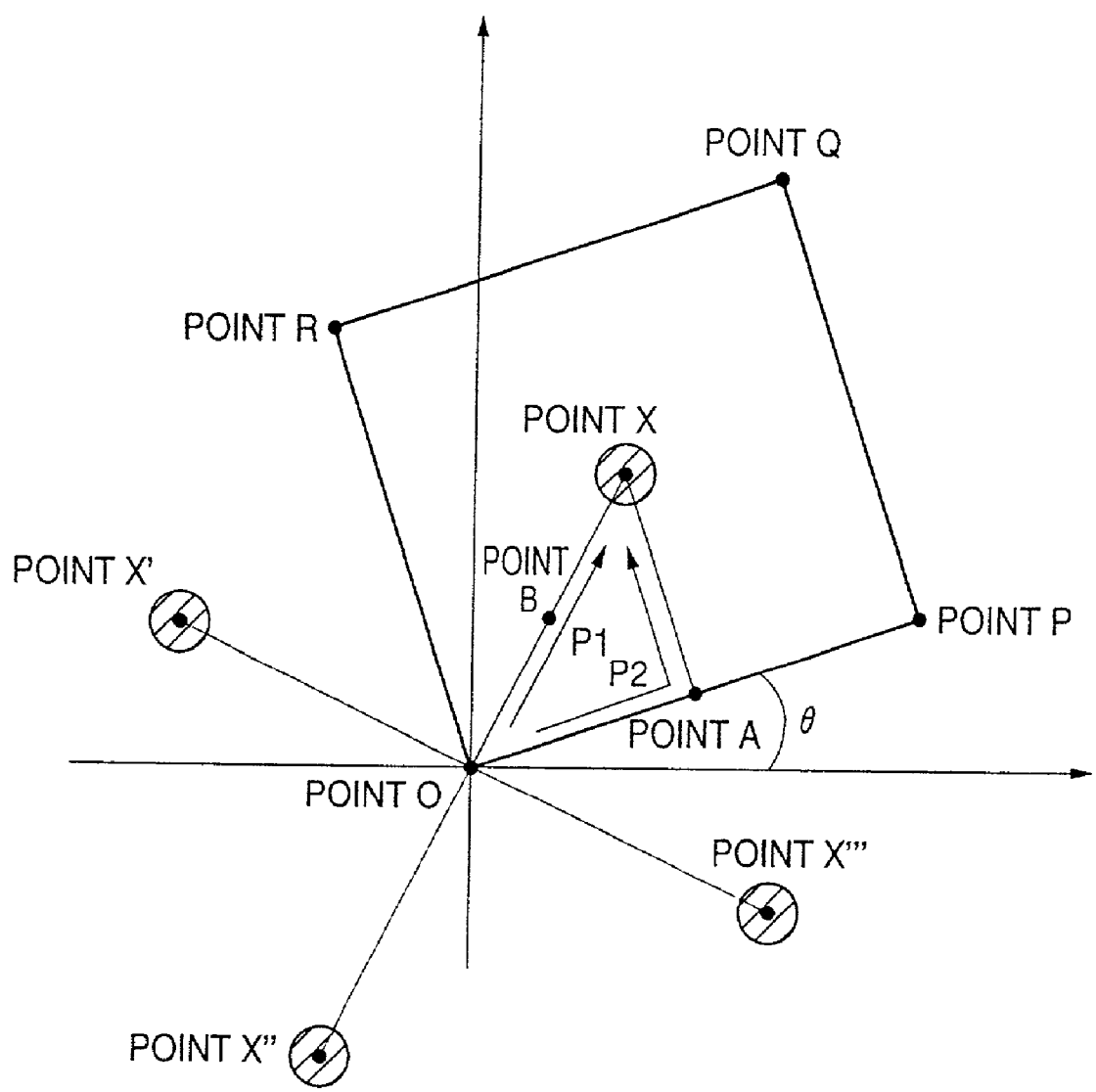
FIG. 16 is an illustration showing paths of a phase change from a phase implementing a Rosette pattern of the clear center to a phase implementing a Rosette pattern of the dot center.

FIG. 16 is an illustration showing paths of a phase change from a phase implementing a Rosette pattern of the clear center to a phase implementing a Rosette pattern of the dot center.

FIG. 16 shows a graph of a space defined by pixel positions extending on a two-dimensional basis. Circles with a slash line, which located at point X, point X" located at a symmetrical position to the point X with respect to point O, point X' located in a direction vertical to a direction extending from the point O to the point X and at the same distance as a distance from the point O to the point X, and point X''', denote halftone dots of a C-plate. While FIG. 16 fails to illustrate halftone dots of an M-plate, a Y-plate and a K-plate, it is assumed that the point O denotes the center portion a1 of the clear center, which is located among the halftone dots of the C-plate, the M-plate, the Y-plate and the K-plate. FIG. 16 shows a square wherein the point O, the point P, the point Q and the point R are given as the vertexes. The O-P direction of the square is oriented with angle θ with respect to the horizontal axis. This square has the point X on the cross point of the diagonals, and corresponds to the dot cell of halftone dots of the point X.

Assuming that the length of four sides OP, PQ, Q R, RO of the square is give with L, and the point O is denoted by (0, 0), the point X is expressed by the following coordinates.

$$(\cos(\theta+45°) \times L/\sqrt{2}, \sin(\theta+45°) \times L/\sqrt{2})$$

Further, in a similar fashion to that of the point X, as the points representing the position of halftone dots, there are raised points in which a translation by an odd number as long as a distance OX in directions of the point X, the point X' and point X", and the point X, the point X', point X" and X'".

Figure 25:
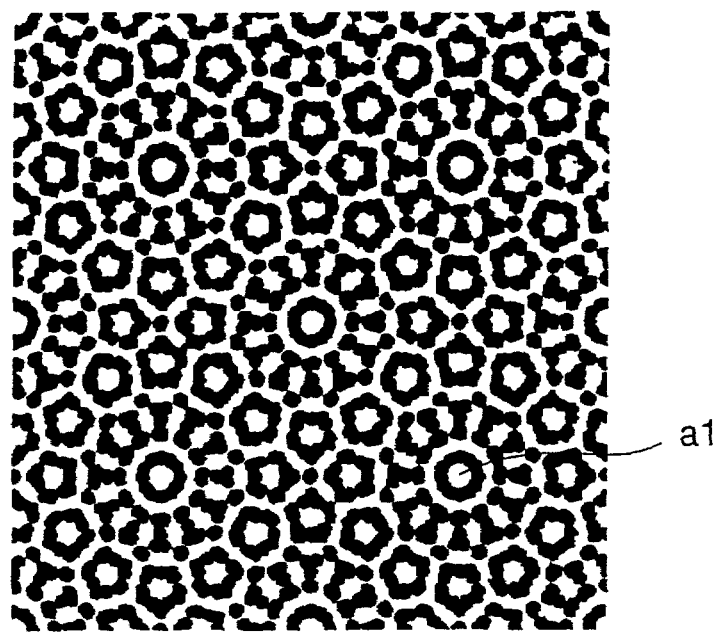
FIG. 25 is an illustration showing a Rosette pattern of the clear center.
Figure 26:
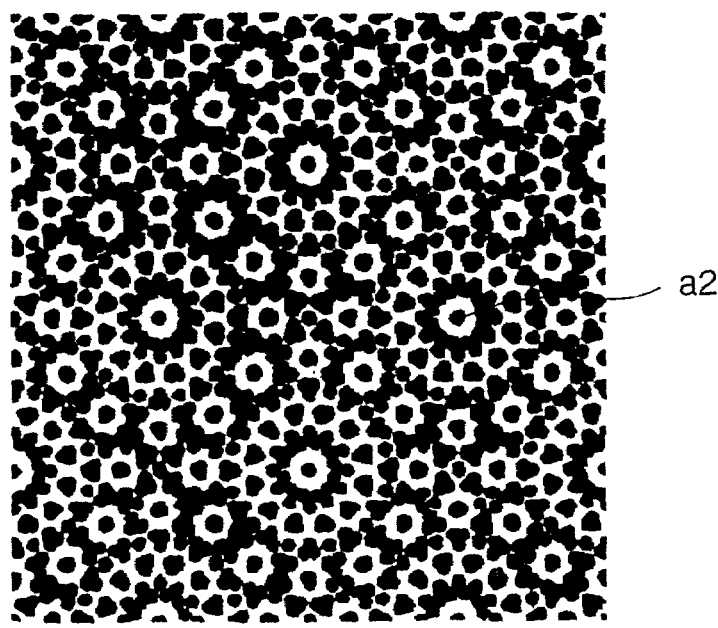
FIG. 26 is an illustration showing a Rosette pattern of the dot center.

A phase of halftone dots in the C-plate of halftone dot image is varied so as to move the point O in parallel to the point X, the point X', point X"and X'". This feature makes it possible to produce stepwise Rosette patterns from the clear center to the dot center, of a color halftone dot image in which the CMYK color plates are superimposed on one another. As paths for the parallel movement from the point O to the point X, there are raised, for example, a path P1 in which the point O passes through the point B (the middle point of the point O and the point X), and moves to the point X in the shortest distance, and a path P2 in which the point O straightly moves to the point A (the middle point of the point O and the point P), and straightly moves form the point A to the point X. FIG. 25 shows a Rosette pattern of the clear center in the event that the point O does not move. FIG. 26 shows a Rosette pattern of the dot center in the event that the point O moves between the point O and the point X.

Figure 17:
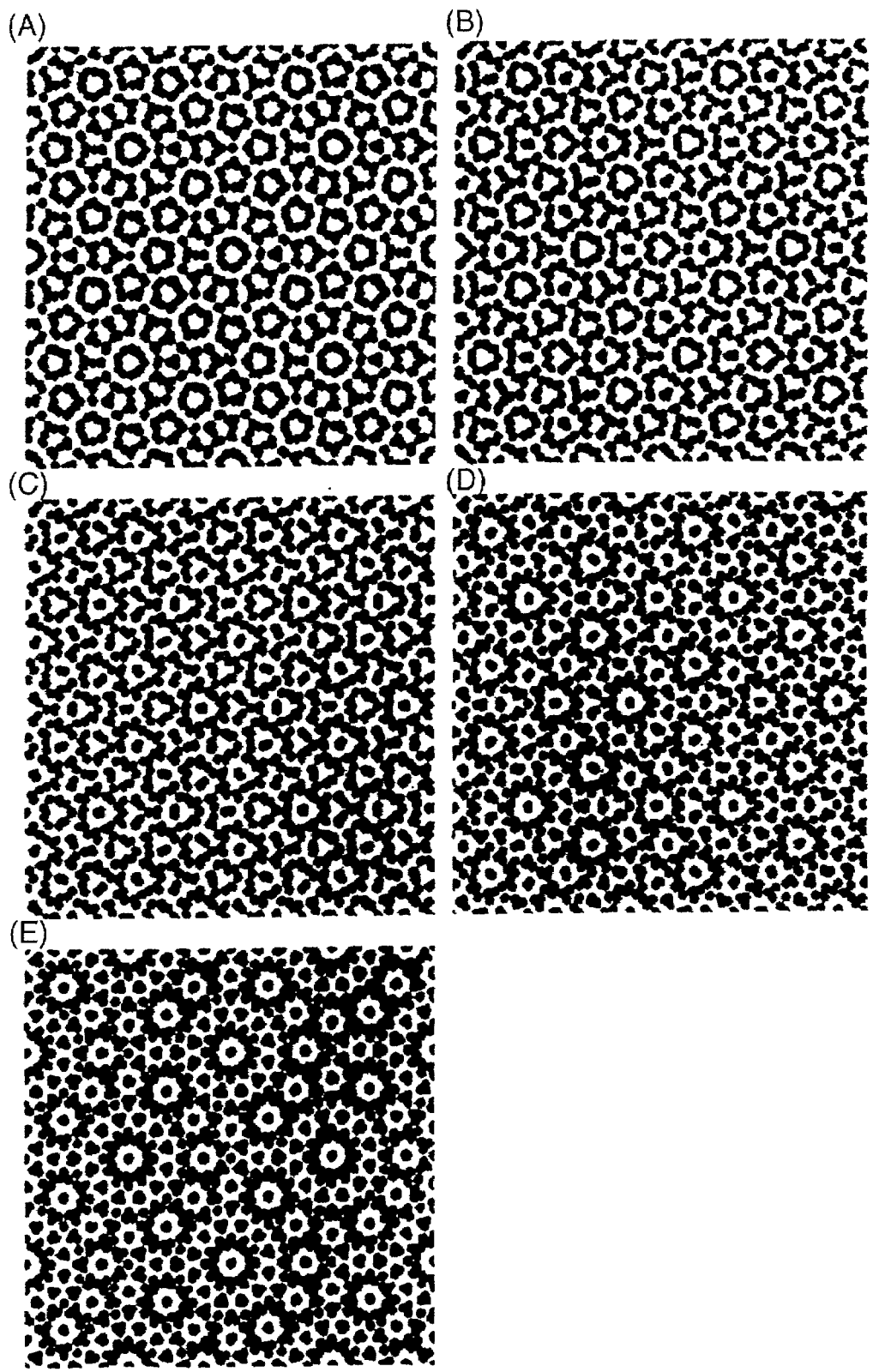
FIG. 17 is illustrations each showing a Rosette pattern in the event that a phase of a halftone dot in a halftone image of a C-plate is changed in the path P1 shown in FIG. 16.

FIG. 17 is illustrations each showing a Rosette pattern in the event that a phase of a halftone dot in a halftone image of a C-plate is changed in the path P1 shown in FIG. 16.

Parts (A), (B), (C), (D), and (E) of FIG. 17 show Rosette patterns in which dots of 20% of three plates, which are apart from one another mutually by 30%, in the event that halftone dots of halftone dot image of the C-plate are varied in phase in such a manner that the point O moves in parallel in the direction of the point X by distances of 1/10 OX, 3/10 OX, 5/10 OX, 7/10 OX, and 9/10 OX, are represented by the black K, respectively. Where the angle θ is 45°. In this case, the point X is represented by the coordinates (0, L/$\sqrt{2}$) and thus this makes it easy to perform the phase control. Performing the parallel movement by OX means that a movement is performed in a direction from the point O to the point X by a distance from the point O to the point X. A point, wherein the point O is moved in parallel by 5/10 OX, corresponds to the point B (0, L/(2$\sqrt{2}$)). In FIG. 17, as a distance of the parallel movement of the point O is increased, the Rosette pattern of the clear center is distorted and a Rosette pattern near the Rosette pattern of the dot center appears. Of those parts (A), (B), (C), (D), and (E) of FIG. 17, the Rosette patterns shown in parts (B) and (C) of FIG. 17 involve no ring-like pattern peculiar to the Rosette moiré. Such a Rosette pattern involving no ring-like pattern is preferable as a Rosette pattern of a halftone dot image represented by the halftone dot image data transmitted to the above-mentioned CTP600.

Figure 18:
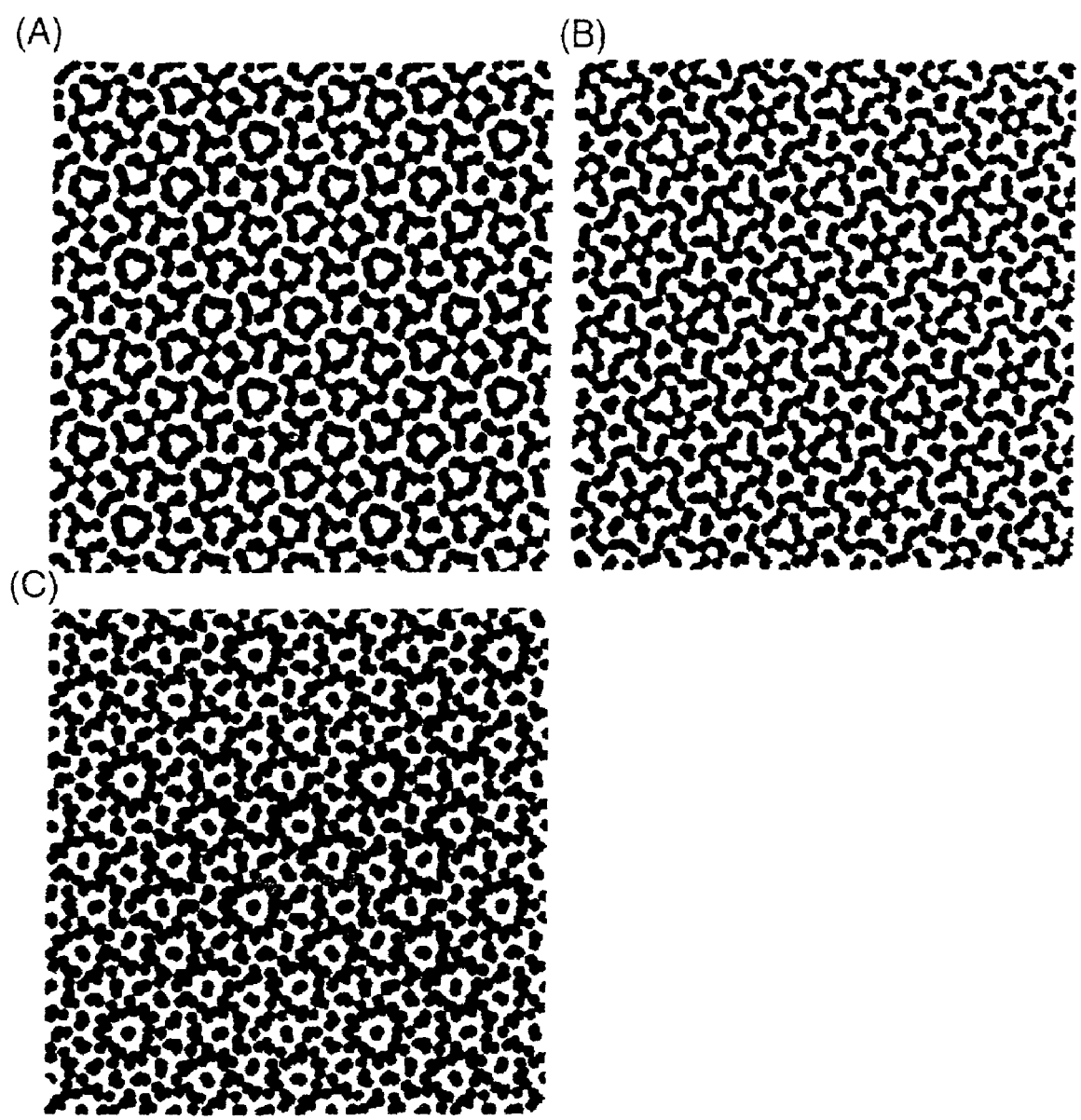
FIG. 18 is illustrations each showing a Rosette pattern in the event that a phase of a halftone dot in a halftone image of a C-plate is changed in the path P2 shown in FIG. 16.

FIG. 18 is illustrations each showing a Rosette pattern in the event that a phase of a halftone dot in a halftone image of a C-plate is changed in the path P2 shown in FIG. 16.

Parts (A), (B), and (C) of FIG. 18 show Rosette patterns in which dots of 20% of three plates, which are apart from one another mutually by 30%, in the event that halftone dots of halftone dot image of the C-plate are varied in phase in such a manner that the point O moves in parallel by distances of 3/5 OA, OA, OA+3/5AX, are represented by the black K, respectively. Where the angle θ is 45°. In this case, the point X is represented by the coordinates (0, L/$\sqrt{2}$), and the point A is represented by the coordinates (L/(2$\sqrt{2}$), L/(2$\sqrt{2}$)). Thus, this makes it easy to perform the phase control. Performing the parallel movement by OA means that a movement is performed in a direction from the point O to the point A by a distance from the point O to the point A. Performing the parallel movement by OA+3/5AX means that such a parallel movement that the point O is moved in parallel in a direction from the point A to the point X by 3/5 of a distance from the point A to the point X is performed. Also in FIG. 18, as the point O approaches the point X through the parallel movement, the Rosette pattern of the clear center is distorted and a Rosette pattern near the Rosette pattern of the dot center appears. Of those parts (A), (B), and (C), of FIG. 18, the Rosette patterns shown in parts (A) and (B) of FIG. 18 involve no ring-like pattern peculiar to the Rosette moiré. Such a Rosette pattern involving no ring-like pattern is preferable as a Rosette pattern of a halftone dot image represented by the halftone dot image data transmitted to the above-mentioned CTP600.

As shown in FIGS. 17 and 18, the Rosette pattern of halftone dots of the halftone dot image takes various patterns in accordance with a sort of the path for varying the phase and the position on the paths. In order that the halftone dot producing apparatus 100 of the above-mentioned proofer reproduces at least approximately the Rosette pattern appearing in accordance with a degree of register discrepancy of images of the color plates, of the halftone dot image printed by the printing system as the object of the proof, it is effective that the phase is controlled by varying the position on a predetermined path, and in some case, a sort of the path.

Lastly, there will be described various aspects of the phase control screen.

Figure 19:
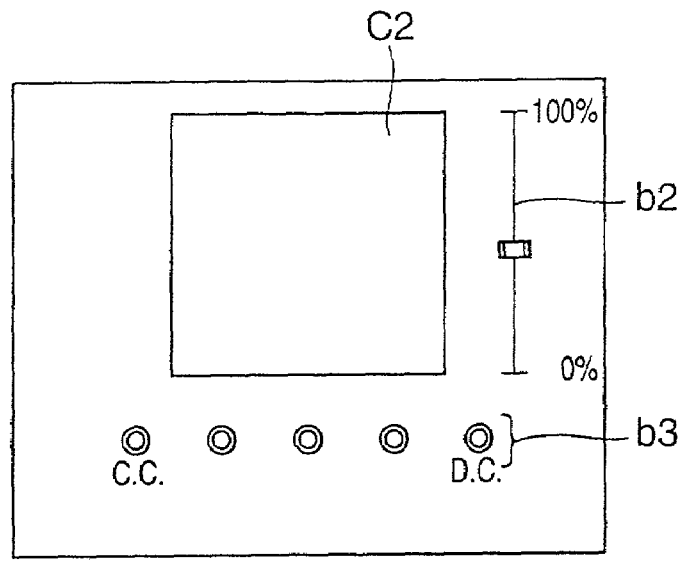
FIG. 19 is a view showing a second phase control screen displaying a Rosette pattern.

FIG. 19 is a view showing a second phase control screen displaying a Rosette pattern.

In the second phase control screen shown in FIG. 19, a plurality of buttons b3 for designating Rosette patterns from the clear center C.C to the dot center are substituted for the slide bar b1 in the first phase control screen shown in FIG. 3.

Figure 20:
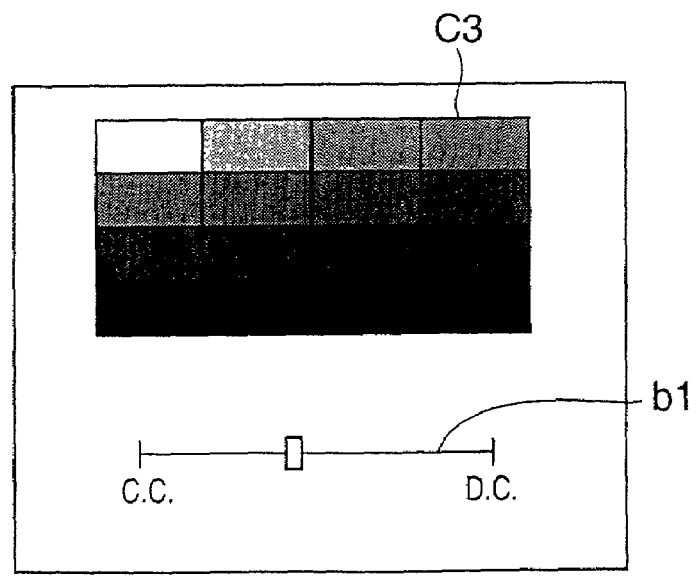
FIG. 20 is a view showing a third phase control screen displaying a Rosette pattern.

FIG. 20 is a view showing a third phase control screen displaying a Rosette pattern.

In the third phase control screen shown in FIG. 20, a plurality of patches c3 for simultaneously representing various Rosette patterns of the associated dot area percentages are substituted for the display screen for Rosette pattern c2 in which a dot area percentage determined is varied in accordance with the operation of the slide bar b2 for an alteration of dot area percentage, in the first phase control screen shown in FIG. 3. A user can easily confirm the various Rosette patterns of the associated dot area percentages through the plurality of patches c3.

Figure 21:
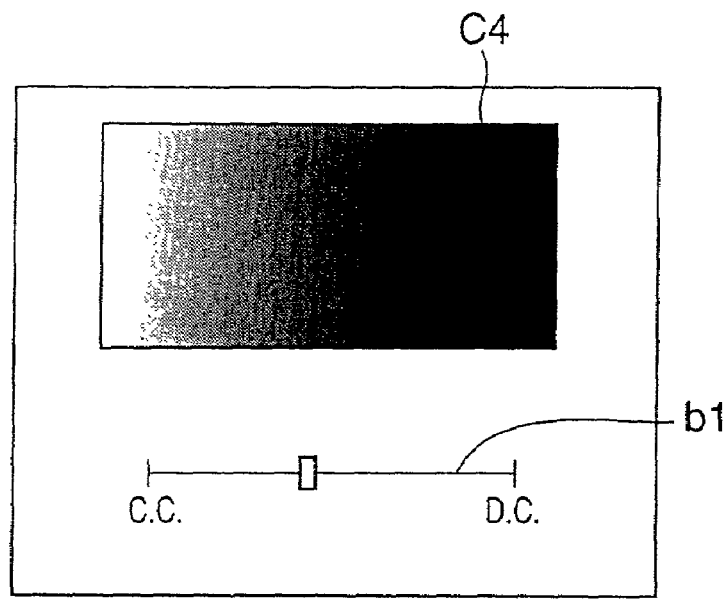
FIG. 21 is a view showing a fourth phase control screen displaying a Rosette pattern.

FIG. 21 is a view showing a fourth phase control screen displaying a Rosette pattern.

In the fourth phase control screen shown in FIG. 21, a gradation c4 representing various Rosette patterns of the associated dot area percentages are substituted for the display screen for Rosette pattern c2 in the first phase control screen shown in FIG. 3. A user can easily confirm the various Rosette patterns of the associated dot area percentages through the gradation c4.

Figure 22:
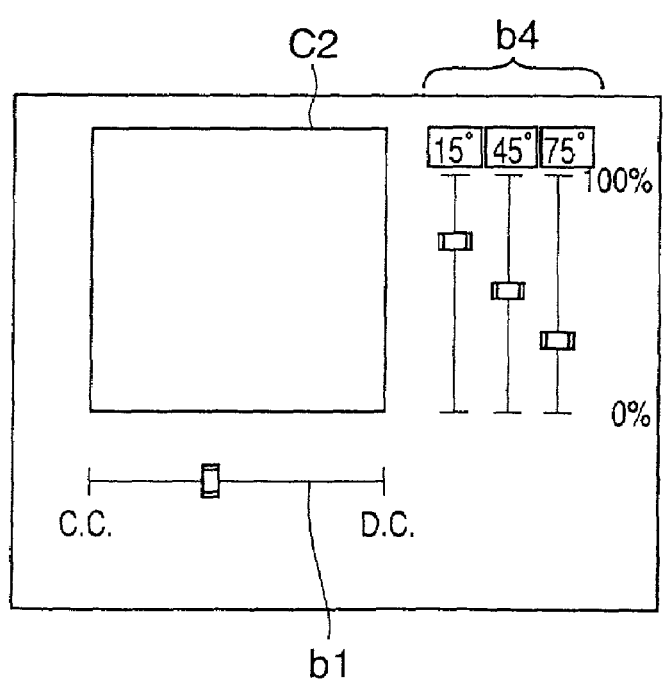
FIG. 22 is a view showing a fifth phase control screen displaying a Rosette pattern.

FIG. 22 is a view showing a fifth phase control screen displaying a Rosette pattern.

In the fifth phase control screen shown in FIG. 22, three slide bars b4 for controlling, for example, the dot area percentages of Rosette patterns of angles of 15°, 45°, and 75° over 0% to 100% are substituted for the slide bar b2 for an alteration of dot area percentage, in the first phase control screen shown in FIG. 3. An adoption of the three slide bars b4 makes it possible to control the dot area percentages of the halftone dot images constituting a Rosette pattern at high degree of freedom.

Figure 23:
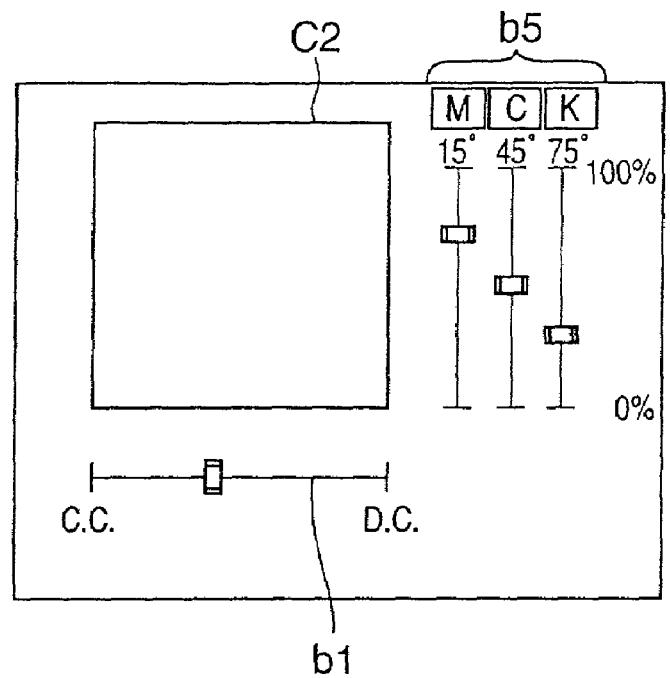
FIG. 23 is a view showing a sixth phase control screen displaying a Rosette pattern.

FIG. 23 is a view showing a sixth phase control screen displaying a Rosette pattern.

In the sixth phase control screen shown in FIG. 23, three slide bars b5 for assigning arbitrarily each color among CMYK colors in accordance with, for example, angles of 15°, 45°, and 75° are substituted for the slide bar b4 for an alteration of dot area percentage, in the fifth phase control screen shown in FIG. 22. An adoption of the three slide bars b5 makes it possible to display on the display screen for Rosette pattern c2 a color of Rosette pattern in which those colors of halftone dots are superimposed on one another.

Figure 24:
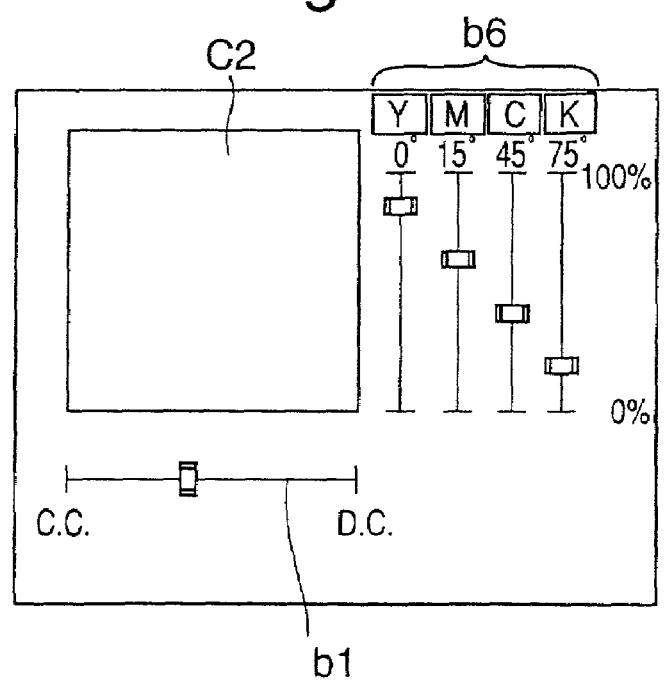
FIG. 24 is a view showing a seventh phase control screen displaying a Rosette pattern.

FIG. 24 is a view showing a seventh phase control screen displaying a Rosette pattern.

In the seventh phase control screen shown in FIG. 24, four slide bars b6 for assigning arbitrarily each color among CMYK colors in accordance with, for example, angles of 0°, 15°, 45°, and 75° are substituted for the slide bar b4 for an alteration of dot area percentage, in the sixth phase control screen shown in FIG. 23. An adoption of the four slide bars b6 makes it possible to display on the display screen for Rosette pattern c2 a color of Rosette pattern in which those colors of halftone dots are superimposed on one another.

As mentioned above, according to the present invention, there is provided a halftone dot producing apparatus in which a phase of halftone dots is freely set up in at least one color plate of the color plates, and a halftone dot producing program storage medium storing a program which causes a computer system to operate as the halftone dot producing apparatus.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A halftone dot producing apparatus for producing a plurality of halftone dot data representative of a plurality of monochromatic images in which a color image is separated, by applying threshold matrixes associated with colors to a plurality of multi-tone level image data representative of a plurality of monochromatic images in which a color image is separated, said halftone dot producing apparatus comprising:
    a phase selection section for selecting a phase between at least a first threshold matrix of said threshold matrixes and a first monochromatic image represented by a multi-tone level image data to which said first threshold matrix is applied;
    a phase control section for controlling a relative phase between said first threshold matrix and said first monochromatic image to implement the phase selected by said phase selection section; and
    a data producing section for producing a plurality of halftone dot data representative of a plurality of monochromatic images in which a color image is separated, by applying threshold matrixes associated with multi-tone level image data representative of monochromatic images excepting said first monochromatic image, of said plurality of multi-tone level image data, to the multi-tone level image data representative of said monochromatic images excepting said first monochromatic image, of said plurality of multi-tone level image data, with a phase determined on a fixed basis, and applying said first threshold matrix to multi-tone level image data representative of said first monochromatic image, of said plurality of multi-tone level image data, with the phase controlled by said phase control section.

2. A halftone dot producing apparatus according to claim 1, wherein said phase selection section selects any one of a plurality of phases between a phase in which a Rosette pattern of a clear center appears on a color image represented by said plurality of halftone dot image data, and a phase in which a Rosette pattern of a dot center appears on the color image represented by said plurality of halftone dot image data.

3. A halftone dot producing apparatus according to claim 1, wherein said phase control section controls a phase of said first threshold matrix for said first monochromatic image.

4. A halftone dot producing apparatus according to claim 1, wherein said phase control section controls a phase of said first monochromatic image to said first threshold matrix.

5. A halftone dot producing apparatus according to claim 1, wherein said halftone dot producing apparatus further comprises:
    an image producing section for producing multi-tone level image data for evaluating a Rosette pattern; and
    a display section for displaying a Rosette pattern on an image represented by an assembly of halftone dot image data obtained by applying the threshold matrixes to the multi-tone level image data produced by said image producing section.

6. A halftone dot producing apparatus according to claim 5, wherein said image producing section produces multi-tone level image data representative of uniform images having uniform values throughout whole image areas as multi-tone level image data for evaluating a Rosette pattern.

7. A halftone dot producing apparatus according to claim 6, wherein said halftone dot producing apparatus further comprises:
    a dot area percentage selection section for selecting a dot area percentage; and
    dot area percentage control means for controlling a relative value between thresholds constituting the threshold matrixes and a density level of the uniform image in such a manner that monochromatic images of the dot area percentage selected by said dot area percentage selection section can be obtained.

8. A halftone dot producing apparatus according to claim 7, wherein said halftone dot producing apparatus further comprises a handler for controlling a dot area percentage, and said dot area percentage selection section selects the dot area percentage in accordance with an operation of said handler.

9. The halftone dot producing apparatus according to claim 1, wherein said halftone dot producing apparatus further comprises a handler for selecting a phase between said first threshold matrix and said first monochromatic image, and said phase selection section selects the phase in accordance with an operation of said handler.

10. The halftone dot producing apparatus according to claim 1, wherein the phase is user selected.

11. The halftone dot producing apparatus according to claim 1, wherein the phase is not tone dependent.

12. The halftone dot producing apparatus according to claim 1, wherein an angle of a screen of halftone dots in at least one of the plurality of halftone dot data is selected by a user.

13. The halftone dot producing apparatus according to claim 1, further comprising:
    a threshold table selection section that selects a threshold table comprising a threshold matrix from a storage section in accordance with a predetermined dot shape, a predetermined line number and predetermined angle of halftone dots.

14. The halftone dot producing apparatus according to claim 1, wherein said phase selection section selects any one of a plurality of phases.

15. A computer-readable storage medium encoded with a halftone dot producing program which causes a computer system to execute the steps of:

selecting a phase between at least a first threshold matrix of threshold matrixes associated with colors and a first monochromatic image represented by a multi-tone level image data to which said first threshold matrix is applied;

controlling a relative phase between said first threshold matrix and said first monochromatic image to implement the selected phase; and producing a plurality of halftone dot data representative of a plurality of monochromatic images in which a color image is separated, by applying threshold matrixes associated with multi-tone level image data representative of monochromatic images excepting said first monochromatic image, of said plurality of multi-tone level image data, to the multi-tone level image data representative of said monochromatic images excepting said first monochromatic image, of said plurality of multi-tone level image data, with a phase determined on a fixed basis, and applying said first threshold matrix to multi-tone level image data representative of said first monochromatic image, of said plurality of multi-tone level image data, with the controlled phase.

* * * * *